US010204153B2

United States Patent
Morimoto et al.

(10) Patent No.: US 10,204,153 B2
(45) Date of Patent: Feb. 12, 2019

(54) DATA ANALYSIS SYSTEM, DATA ANALYSIS METHOD, DATA ANALYSIS PROGRAM, AND STORAGE MEDIUM

(71) Applicant: FRONTEO, INC., Tokyo (JP)

(72) Inventors: Masahiro Morimoto, Tokyo (JP); Yoshikatsu Shirai, Tokyo (JP); Hideki Takeda, Tokyo (JP); Kazumi Hasuko, Tokyo (JP); Akiteru Hanatani, Tokyo (JP); Jakob Halskov, Tokyo (JP); Nanako Yoshida, Tokyo (JP)

(73) Assignee: FRONTEO, INC., Tokyo (JP)

( * ) Notice: Subject to any disclaimer, the term of this patent is extended or adjusted under 35 U.S.C. 154(b) by 0 days.

(21) Appl. No.: 15/382,337

(22) Filed: Dec. 16, 2016

(65) Prior Publication Data

US 2017/0097983 A1    Apr. 6, 2017

Related U.S. Application Data

(63) Continuation of application No. 14/921,444, filed on Oct. 23, 2015, now Pat. No. 9,563,652, which is a
(Continued)

(51) Int. Cl.
*G06F 17/30* (2006.01)

(52) U.S. Cl.
CPC .... *G06F 17/30598* (2013.01); *G06F 17/3053* (2013.01); *G06F 17/30321* (2013.01); *G06F 17/30333* (2013.01)

(58) Field of Classification Search
CPC ....................................................... G06F 17/30
See application file for complete search history.

(56) References Cited

U.S. PATENT DOCUMENTS

| 6,606,659 B1 | 8/2003 | Hegli et al. |
| 6,622,140 B1 | 9/2003 | Kantrowitz |

(Continued)

FOREIGN PATENT DOCUMENTS

| CN | 1291337 C | 12/2006 |
| JP | 2002202983 A | 7/2002 |

(Continued)

OTHER PUBLICATIONS

International Search Report (PCT/JP2015/060299) dated May 19, 2015 (15 pages) with translation.
(Continued)

*Primary Examiner* — Khanh B Pham
(74) *Attorney, Agent, or Firm* — Brundidge & Stanger, P.C.

(57) ABSTRACT

The present invention relates to data analysis for evaluating a plurality of pieces of object data; and the evaluation corresponds to the relation between each piece of object data and a specified case. An index that enables ranking of the plurality of pieces of object data is generated by the evaluation and the index changes based on an input entered by a user. A pattern is extracted that characterizes the reference data from the reference data according to the classification information assigned by the input. The index is determined by evaluating the relation between the object data and the specified case based on the extracted pattern and set to the object data. The plurality of pieces of object data are ranked according to the index and reported the user.

20 Claims, 12 Drawing Sheets

Related U.S. Application Data continuation of application No. PCT/JP2015/060299, filed on Mar. 31, 2015.

(56) References Cited

U.S. PATENT DOCUMENTS

| | | | |
|---|---|---|---|
| 8,311,960 B1 | 11/2012 | Ginzburg et al. | |
| 8,543,576 B1* | 9/2013 | Buryak | G06F 17/30707 707/737 |
| 9,245,243 B2* | 1/2016 | Mohan | G06Q 10/06 |
| 2002/0152051 A1 | 10/2002 | Fukushige et al. | |
| 2003/0130993 A1 | 7/2003 | Mendelevitch et al. | |
| 2004/0029085 A1 | 2/2004 | Hu et al. | |
| 2005/0192919 A1 | 9/2005 | Liang | |
| 2008/0162385 A1 | 7/2008 | Madani et al. | |
| 2008/0249999 A1 | 10/2008 | Renders et al. | |
| 2014/0006338 A1 | 1/2014 | Watson et al. | |
| 2014/0122110 A1 | 5/2014 | Papier et al. | |
| 2014/0122410 A1* | 5/2014 | Ludlow | G06N 99/005 706/59 |
| 2014/0279716 A1 | 9/2014 | Cormack et al. | |
| 2015/0088876 A1 | 3/2015 | Morimoto et al. | |

FOREIGN PATENT DOCUMENTS

| | | |
|---|---|---|
| JP | 2004514220 A | 5/2004 |
| JP | 2004157981 A | 6/2004 |
| JP | 2007172249 A | 7/2007 |
| JP | 2008-257732 | 10/2008 |
| JP | 2009251825 A | 10/2009 |
| JP | 2014056516 A | 3/2014 |
| JP | 5572255 B1 | 7/2014 |
| TW | 200527232 A | 8/2005 |
| TW | 201403353 A | 1/2014 |
| WO | WO 2014057962 A1 | 4/2014 |
| WO | WO 2014057964 A1 | 4/2014 |
| WO | WO 2015025551 A1 | 2/2015 |
| WO | WO 2015030112 A1 | 5/2015 |

OTHER PUBLICATIONS

JP Office action issued in corresponding application No. JP2016-564340, dated Dec. 27, 2016 with English translation, 15 pages.

* cited by examiner

FIG.6

| Data ID | Name | Index | Classification Information |
|---------|------|-------|---------------------------|
| 1 | a a a a | 2000 | Respective |
| 2 | b b b b | 2500 | Respective |
| 3 | c c c c | 300 | Non-Respective |

DATA ANALYSIS SYSTEM, DATA ANALYSIS METHOD, DATA ANALYSIS PROGRAM, AND STORAGE MEDIUM

CROSS-REFERENCE TO RELATED APPLICATIONS

The present application is a continuation of U.S. application Ser. No. 14/921,444 filed Oct. 23, 2015, which was a continuation of International Application number PCT/JP2015/060299, with an international filing date of Mar. 31, 2015, the disclosures of which are incorporated herein by reference in its entirety for all purposes.

BACKGROUND

Field of Invention

The present invention relates to, for example, a data analysis system for analyzing data.

Description of the Related Art

As a result of the advancement of informalization in the society due to rapid development of computers, an enormous amount of information (big data) has become involved in corporate and individual activities. Consequently, great importance has been attached to the necessity to distinguish desired information from among the big data.

Examples of an approach to extract desired information from the big data include, for example, an approach to extract desired data by classifying the data in advance, an approach to make it possible to extract the desired data based on a simple text search, and an approach to extract the desired data based on natural language processing.

For example, PTL (Patent Literature) 1 mentioned below suggests, with the purpose of providing a mechanism capable of locating deeply-related extraction keywords flexibly at close positions on the basis of the relationship between the extraction keywords in a set of documents in order to extract information from the big data, a device that calculates the degree of contribution for discriminating the keywords contained in documents, whose fields are classified, from other documents, classify and display the documents into units by using a self-organizing map based on this calculated degree of contribution, and then calculates locational information about the keywords from appearance frequency of the keywords contained in the documents in the units, and also displays the locational information together with the documents in the units.

[PTL 1] Japanese Patent Application Laid-Open (Kokai) Publication No. 2014-056516.

SUMMARY OF THE CLAIMED INVENTION

It is necessary to consider factors which cannot be fully recognized only with the keywords or reference numerals, such as the user's intent and search purpose, and the user's impression of the entire data, in order to precisely find the necessary information for the user from the big data. However, the above-described conventional method is utterly insufficient at. So, it is eventually necessary for the user to classify an enormous amount of information piece by piece and it is inevitable to spend considerable effort and time.

Therefore, it is an object of the present invention to provide a data analysis technique capable of efficiently finding necessary information for the user.

Means for Solving the Problems

The present invention is an invention relating to data analysis for evaluating object data and evaluates a plurality of pieces of object data; and the evaluation may correspond to, for example, the relation between each piece of object data and a specified case. Furthermore, an index that enables ranking of the plurality of pieces of object data is generated by the evaluation and the index changes based on input entered by a user.

The ranking of the plurality of pieces of object data changes, for example, according to the index that changes based on the input. The input classifies, for example, reference data, which is different from the plurality of pieces of object data, based on the relation between the reference data and the specified case. The classification is classification into a plurality of pieces of classification information, for example, according to the content of the reference data and at least one of the plurality of pieces of classification information is assigned by the input to the reference data.

The present invention extracts a pattern that characterizes the reference data from the reference data according to the classification information assigned by the input by, for example, evaluating the degree of contribution to a combination of a plurality of components included in the reference data and provided from the input control device.

The present invention determines the index by, for example, by evaluating the relation between the object data and the specified case based on the extracted pattern, sets the determined index to the object data, ranks the plurality of pieces of object data according to the index, and reports the plurality of pieces of ranked object data to the user.

The plurality of pieces of ranked object data enables the user to recognize, for example, the degree of relation between the plurality of pieces of object data and the specified case, that is, whether they are is highly or distantly related. If the user cannot agree on the degree of relation among the plurality of pieces of object data, the user could change the classification information assigned to the reference data, so that this change causes the index to change and the changed index further changes the ranking of the plurality of pieces of object data. After the user understands, for example, the content of the entire reference data, the user determines the classification information to be assigned to the reference data according to the content of the reference data. The user might not be able to determine which classification information, among the plurality of pieces of classification information, would be the best classification information for the reference data, depending on the content of the reference data. The user can determine which classification information should be assigned to the reference data, for example, on the basis of the plurality of pieces of ranked object data.

Advantageous Effects of Invention

The present invention has the advantageous effect that it can find necessary information for the user efficiently.

BRIEF DESCRIPTION OF THE DRAWINGS

FIG. 6 is an example of a management table that stores object data;

DETAILED DESCRIPTION

Embodiments of the present invention will be explained with reference to drawings.

Configuration of Data Analysis System

Figure 1:
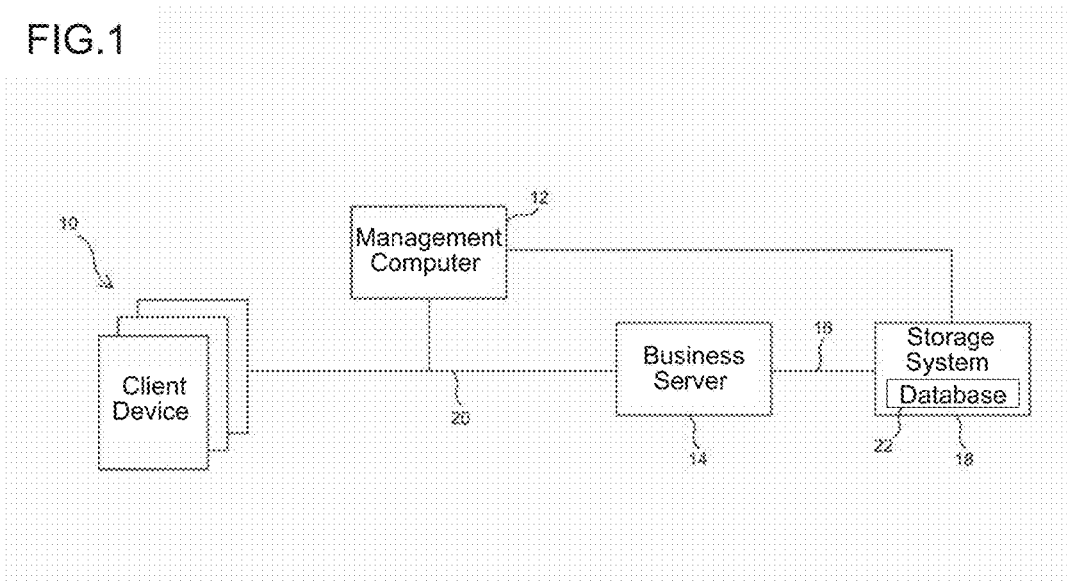
FIG. 1 is a block diagram illustrating an example of a hardware configuration of a data analysis system.

FIG. 1 is a block diagram illustrating an example of a hardware configuration of a data analysis system. As illustrated in FIG. 1, the data analysis system includes, for example: a business server 14 capable of executing major processing of data analysis; one or more client devices 10 capable of executing processing related to the data analysis; a storage system 18 including object data that is an object of the data analysis, and a database 22 which records results of evaluation and classification of the object data; and a management computer 12 which provides the client device 10 and the business server 14 with a management function for the data analysis.

Incidentally, in this embodiment, "data" may be any data expressed in a format that can be processed by the data analysis system. Under this circumstance, the above-mentioned data may be, for example, unstructured data, at least part of which has incomplete structural definitions, and widely include document data at least partly including texts written in a natural language(s) (for example, e-mails [including attached files and header information], technical documents [widely including documents which explain technical matters such as academic papers, patent publications, product specifications, and designs], presentation materials, spreadsheet documents, financial statements, meeting materials, reports, sales materials, contracts, organization charts, and business plans), sound data (such as data in which conversations and music are recorded), image data (such as data composed of a plurality of picture elements or vector information), and video data (such as data composed of a plurality of frame images). Under this circumstance, "components" of data may be partial data, which constitutes at least part of the data, and may be, for example: morphemes, keywords, sentences, and/or paragraphs which constitute documents; partial sounds, volume (gain) information, and/or tone information which constitute sounds; partial images, partial picture elements, and/or brightness information which constitute images; and frame images, motion information, and/or three-dimensional information which constitute videos.

The client device 10 provides a user who has the right to evaluate and classify data (evaluation right holding user) with reference data. The above-mentioned evaluation right holding user can input the reference data via the client device 10 in order to perform the evaluation and classification. Incidentally, in this embodiment, the "reference data" may be, for example, data associated with classification information by the user (classified data). On the other hand, the "object data" may be data which are not associated with the classification information (data which are not presented as the reference data to the user and are not classified and remain as unclassified data for the user). Under this circumstance, the above-mentioned "classification information" may be a classification label used to classify the reference data. The classification information may be, for example, information that classifies the reference data into a plurality of types, for example, three types such as a "Related" label indicating that the reference data as a whole is related to a specified case, a "High" label indicating that both of them are particularly related, and a "Non-Related" label indicating that both of them are not related, or five types such as "Good," "Slightly Good," "Average," "Slightly Bad," and "Bad."

Furthermore, the above-mentioned "specified case" widely includes objects whose relation with the data is evaluated by the data analysis system and whose range is not limited. For example, when the data analysis system is implemented as a discovery support system, the specified case may be the relevant lawsuit for which discovery procedures are required; when the data analysis system is implemented as a criminal investigation support (forensic) system, the specified case may be a criminal case which may be an object to be investigated; when the data analysis system is implemented as an e-mail monitoring system, the specified case may be an illicit act (such as information leakage or bid-rigging); when the data analysis system is implemented as a medical application system (such as a pharmacovigilance support system, a clinical trial efficiency improvement system, a medical risk hedge system, a fall-prediction (fall-prevention) system, a prognosis prediction system, or a diagnostic support system), the specified case may be a case or event related to medicines; when the data analysis system is implemented as an Internet application system (such as a SmartMail system, an information aggregation (curation) system, a user monitoring system, or a social media management system), the specified case may be a case or event related to the Internet; when the data analysis system is implemented as a project evaluation system, the specified case may be a project that was carried out in the past; when the data analysis system is implemented as a marketing support system, the specified case may be a product or service which is a marketing object; when the data analysis system is implemented as an intellectual property evaluation system, the specified case may be an intellectual property which is an evaluation object; when the data analysis system is implemented as an unfair trade monitoring system, the specified case may be a fraudulent financial transaction; when the data analysis system is implemented as a call center escalation system, the specified case may be a case handled in the past; when the data analysis system is implemented as a credit investigation system, the specified case may be an object of credit investigation; when the data analysis system is implemented as a driving support system, the specified case may relate to driving of a vehicle; or when the data analysis system is implemented as a business support system, the specified case may be business results.

The client device 10 is equipped with known computer hardware resources and may include, for example, a memory (such as a hard disk and a flash memory), a controller (CPU; Central Processing Unit), a bus, input/output interfaces (such as a keyboard and a display), and a communications interface. The client device 10 is connected via a communications means 20 such as a LAN to the business server 14 and the management computer 12 so that they can communicate with each other via the communications interface. Furthermore, the memory stores, for example, application programs for making the client device 10 function; and the controller enables the evaluation right holding user to perform necessary inputs and outputs for the classification and evaluation processing by executing the application programs.

The business server 14 learns patterns (which broadly indicate, for example, abstract rules, meaning, concepts, formats, distribution, and samples included in the data and are not limited to a so-called the "specific pattern") from the reference data on the basis of the results of classification of the reference data and evaluates the object on the basis of the patterns. Specifically speaking, the business server 14 is designed to be capable of distinguishing data desired by a user from among many pieces of object data by presenting the reference data to the user, allowing the user to input classification information with respect to the reference data, learning patterns based on the user's input results, and enabling evaluation of the object data on the basis of the learning results. Similarly to the client device 10, the business server 14 may include, as hardware resources, for example, a memory, a controller, a bus, input/output interfaces, and a communications interface. Furthermore, the memory stores application programs for making the business server 14 function; and the controller executes processing for data analysis on the basis of the application programs.

The management computer 12 executes specified management processing on the client device 10, the storage system 18, and, the business server 14. Similarly to the client device 10, the management computer 12 may include, as hardware resources, for example, a memory, a controller, a bus, input/output interfaces, and a communications interface. Furthermore, the memory of the management computer 12 stores, for example, application programs for the controller to execute the management processing.

The storage system 18 is configured of, for example, a disk array system and may include a database 22 that records object data and results of evaluation and classification of the object data. The business server 14 and the storage system 18 are connected (16) via a DAS (Direct Attached Storage) method or a SAN (Storage Area Network).

Incidentally, the hardware configuration illustrated in FIG. 1 is indicated merely as an example and the data analysis system can be also implemented by other hardware configurations. For example, a configuration in which part or whole of processing executed by the business server 14 is executed by the client device 10 may be employed; or a configuration in which the storage system 18 is built into the business server 14 may be employed. Those skilled in the art understand that various hardware configurations capable of implementing the data analysis system can exist; and the hardware configuration is not limited to any of those configurations (such as the configuration illustrated in FIG. 1).

Functions of Data Analysis System

Figure 2:
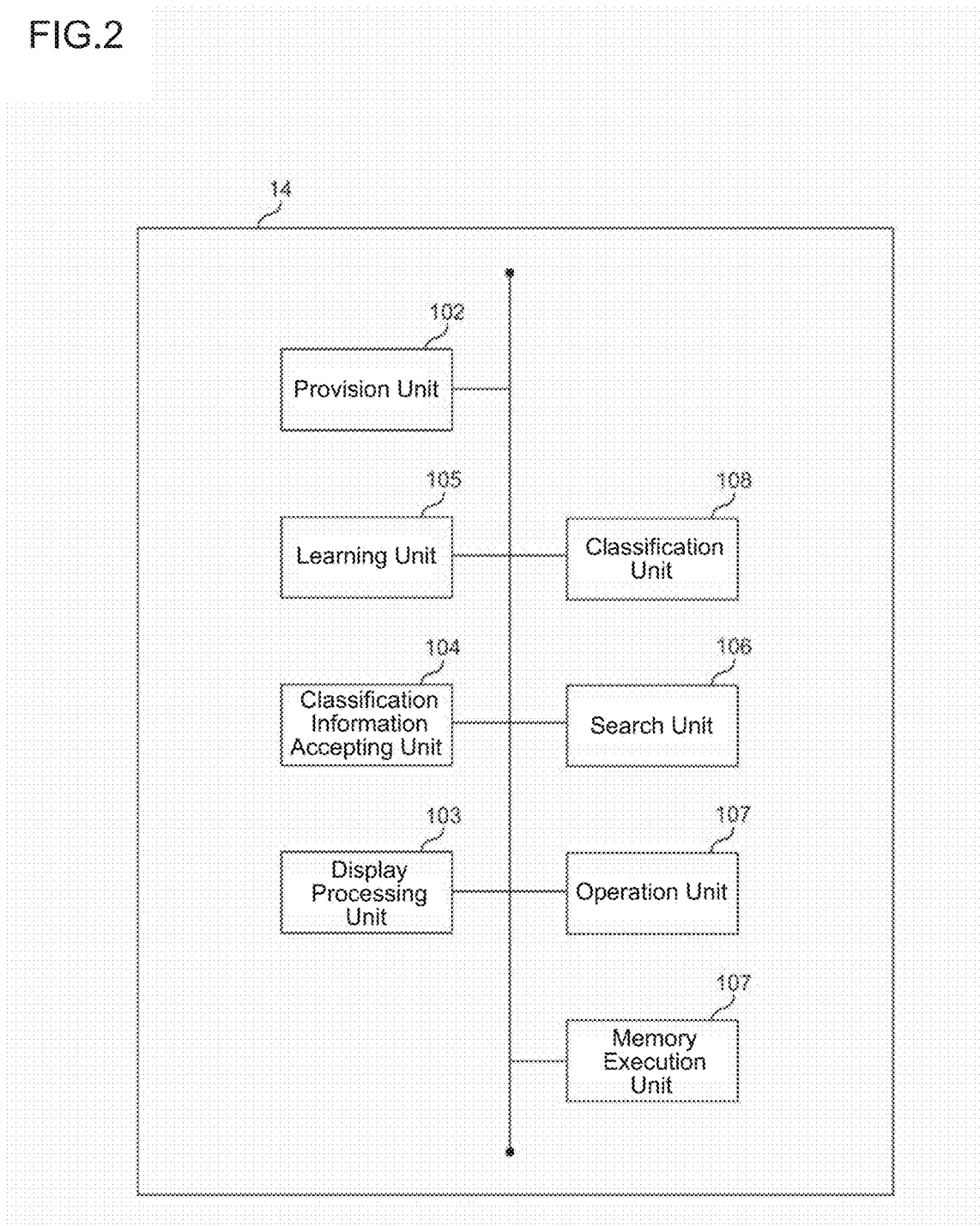
FIG. 2 is a functional block diagram illustrating an example of a functional configuration of a business server.

FIG. 2 is a functional block diagram illustrating an example of the functional configuration of the business server 14. As illustrated in FIG. 2, the business server 14 may include, for example: a reference data provision unit 102 that creates a plurality of samples from part of the object data, which are stored in the database 22, in accordance with a specified standard (for example, randomly) and provides them as reference data; a display processing unit 103 that has a display means of the client device 10 output, for example, classification for the reference data and information for ranking and classification with respect to data other than the reference data; a classification information accepting unit 104 that accepts settings (labeling) of the classification information from a user who has an evaluator's right with respect to the reference data; and a learning unit 105 that classifies the plurality of pieces of reference data with respect to each piece of classification information on the basis of the classification information and learns patterns included in the reference data with respect to each piece of classification information.

The business server 14 may further include, for example: a memory execution unit 201 that has the database 22 store components of the data and evaluation values of the components; a search unit 106 that executes search processing on the database 22 and searches a pattern from the object data other than the reference data; an operation unit 107 that calculates an index indicative of whether the relation between the object data and the specified case is high or low, with respect to each piece of the object data and ranks the plurality of pieces of object data on the basis of the index; and a classification unit 108 that assigns the classification information to the object data on the basis of the ranking results of the object data.

Incidentally, since the components expressed as "xxxx units" in the above description are functional components implemented by the controller for the business server 14 by executing a program (data analysis program), the xxxx units may be substituted with xxxx processing or xxxx functions. Furthermore, since the xxxx units can be substituted with the hardware resources, those skilled in the art understand that these functional blocks can be implemented in various manners, for example, by only hardware, only software, or a combination of the hardware and the software and are not limited to any of them.

Operation of Data Analysis System

Figure 3:
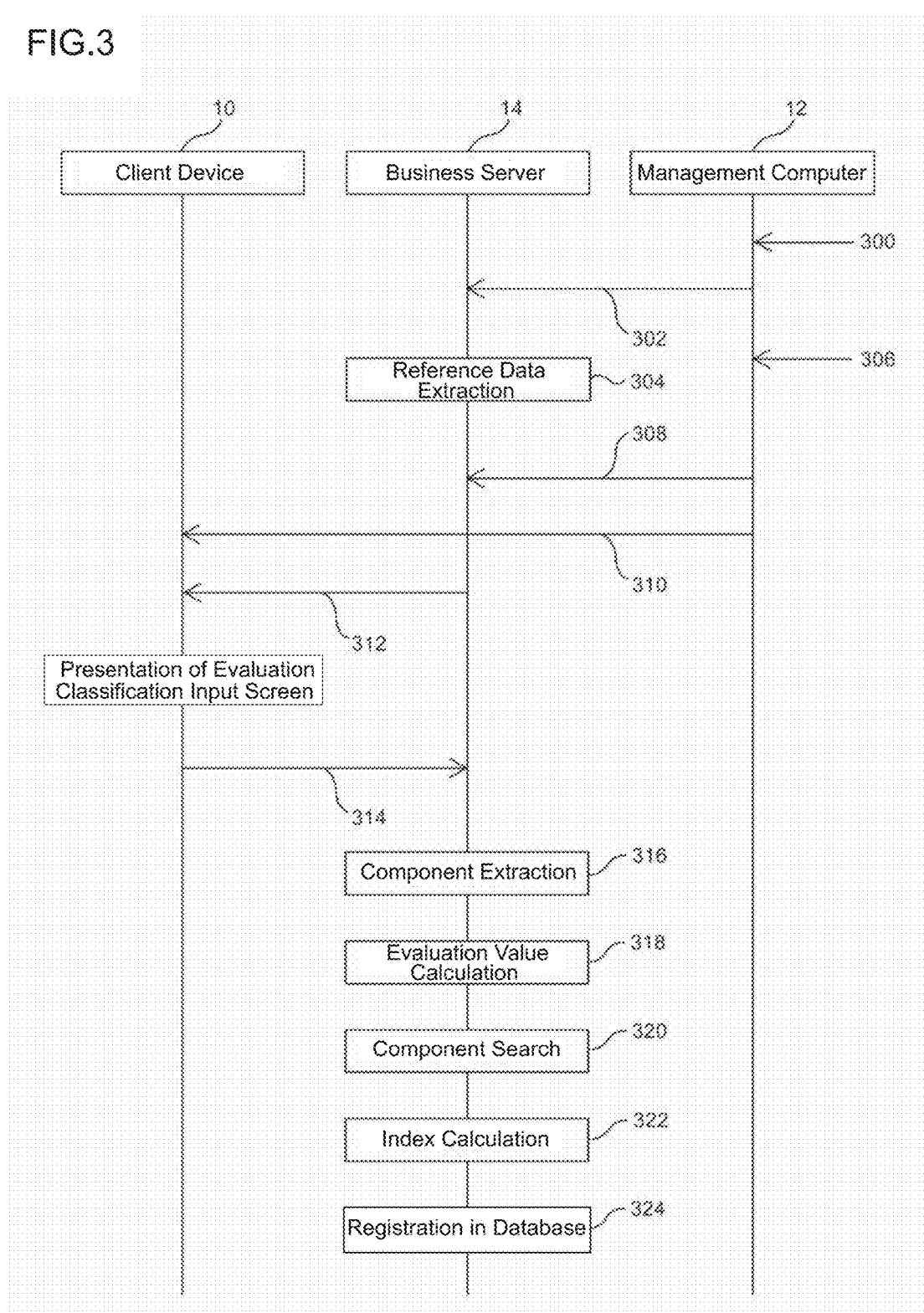
FIG. 3 is a flowchart illustrating an operation example of the data analysis system.

FIG. 3 is a flowchart illustrating an operation example of the data analysis system. An administrative user who has an administrator's right makes a request (extraction request 300) to the management computer 12 to extract (sample) the reference data. The extraction request 300 may be, for example, a request for random sampling of a predetermined quantity of data as the reference data from the data recorded in the database 22 or a request for sampling of the predetermined quantity of data as the reference data from a specified range of data (for example, data whose update dates and times are within three days). Incidentally, a rate or quantity of data extracted as the reference data can be set as appropriate by the administrative user.

The management computer 12 generates an extraction command 302 on the basis of the extraction request 300 and transmits the extraction command 302 to the business server 14. The reference data provision unit 102 of the business server 14 extracts a predetermined quantity of reference data from the database 22 on the basis of the extraction command 302 from the management computer 12 (304).

Figure 4:
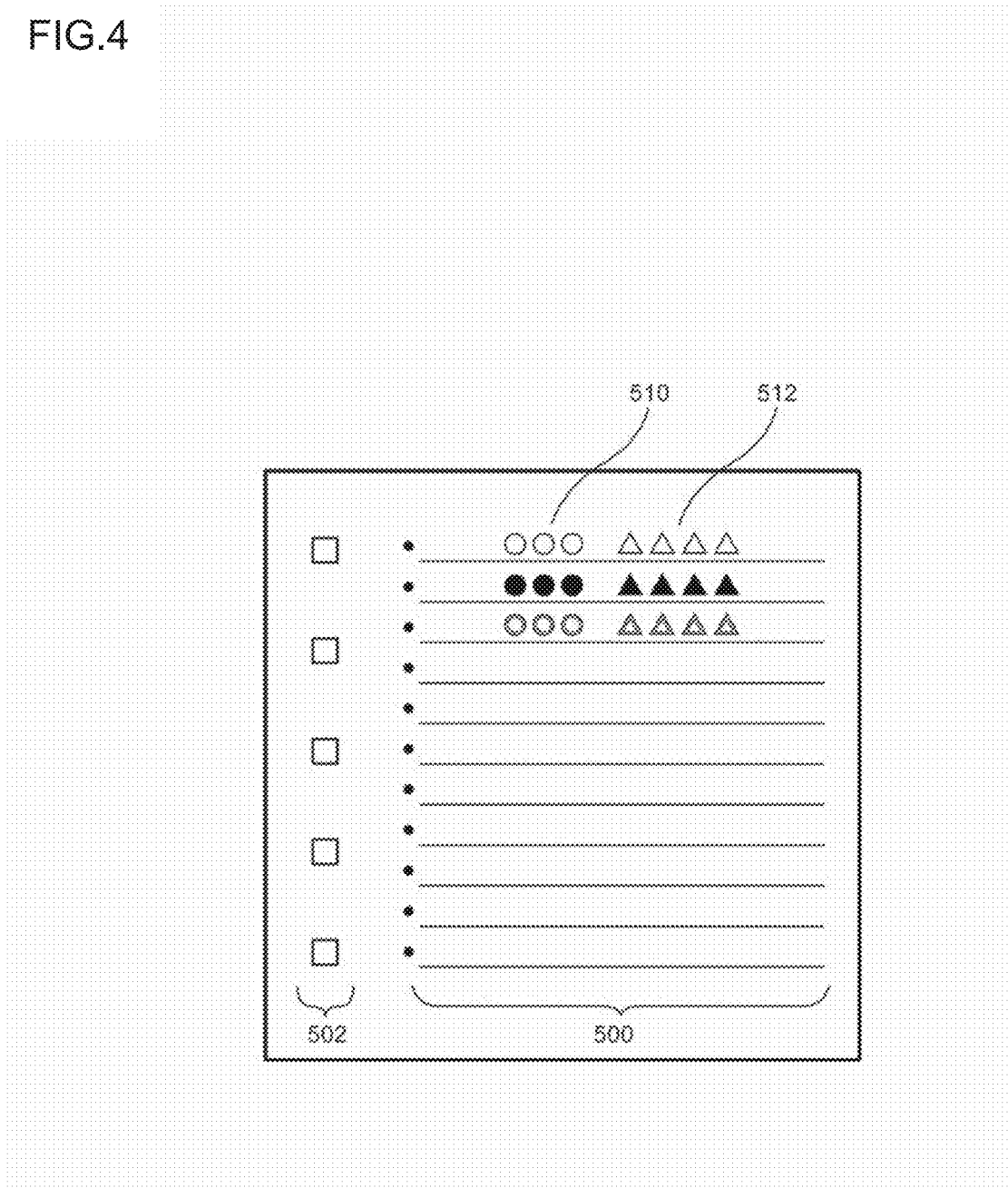
FIG. 4 is a diagrammatic illustration illustrating an example of an interface (input screen) for inputting classification with respect to reference data.

The reference data provision unit 102 of the business server 14 transmits the extracted reference data to a specified client device 10 (the client device specified by the extraction command 302) (312). The specified client device 10 activates an evaluation classification input interface and presents an evaluation classification input screen to the evaluation right holding user. FIG. 4 is an example of the evaluation classification input screen. The evaluation classification input screen may include, for example, a reference data list 500 and check boxes 502 indicative of the classification information for the respective pieces of object data.

Figure 5:
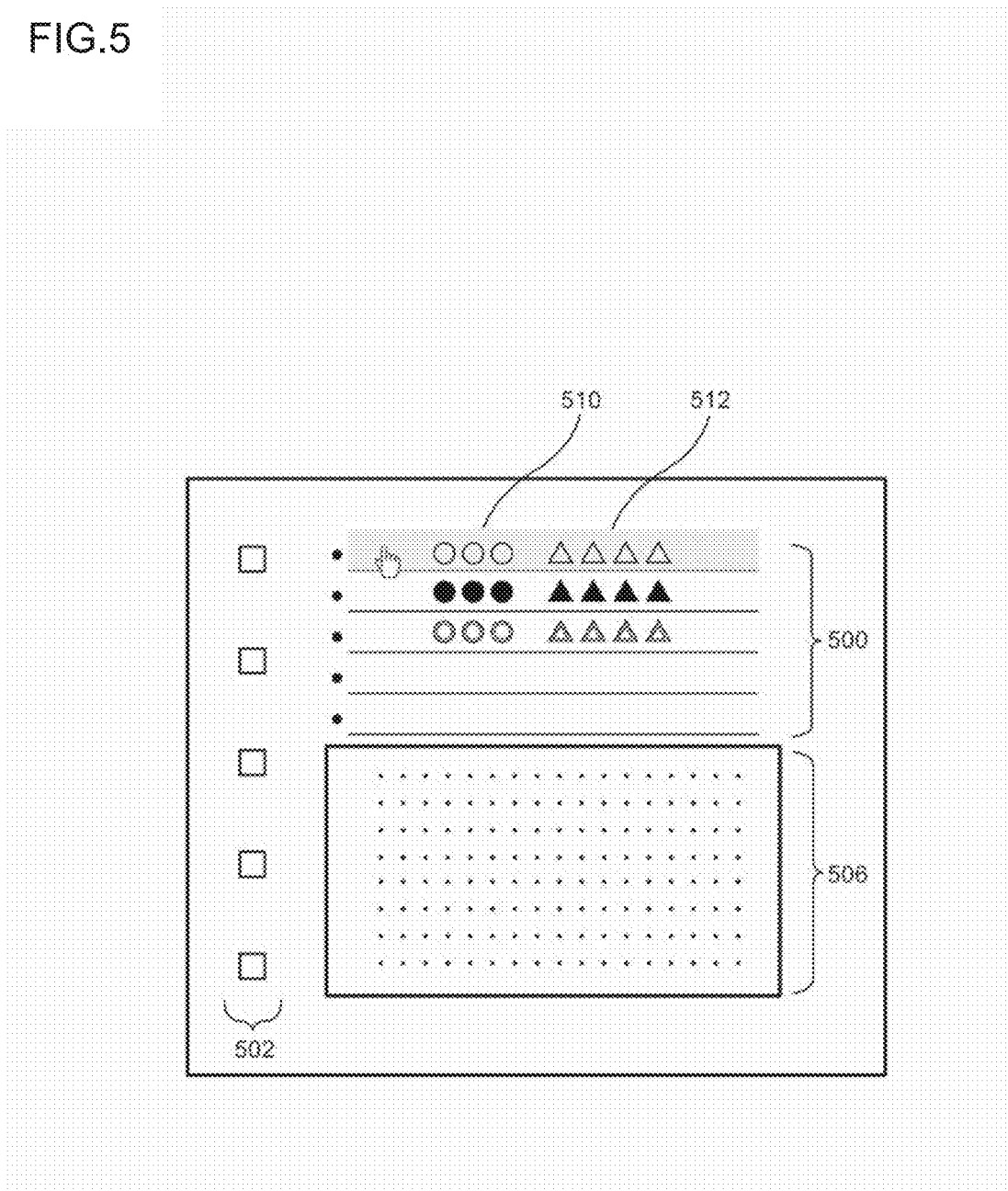
FIG. 5 is a diagrammatic illustration illustrating another example of the interface (input screen) for inputting classification with respect to the reference data.

When the evaluation right holding user selects one piece of reference data from the list which makes it possible to list up the plurality of pieces of reference data, for example, the details 506 of the selected object data are displayed as illustrated in FIG. 5. The details 506 of the reference data may be composed of, for example, an ID 510 of the data, the name 512 of the data, and the content (such as a text of document data) 506 of the object data.

After the evaluation right holding user comprehends the content of the reference data by referring to the details 506 of the reference data, they can classify the reference data by entering a check mark in a check box indicating a label for each piece of the reference data. For example, if the evaluation right holding user thinks that the data is related to a specified case, they enter the check mark in a check box indicative of "Related"; if the evaluation right holding user thinks that the data is particularly related to the specified case, they enter the check mark in a check box indicative of "High"; and if the evaluation right holding user thinks that the data is not related to the specified case, they enter the check mark in a check box indicative of "Non-Related." Once the check mark is entered in the check box, that information is transmitted to the business server (314) and the business server 14 records a combination of the classification information and the reference data in the database 22.

The learning unit 105 of the business server 14 refers to the combination recorded in the database 22 and extracts a component(s) from a set of reference data for each piece of classification information (316). The learning unit 105 can extract, for example, a morpheme (keyword) that appears in a plurality of pieces of reference data, to which the same classification information is attached, at specified or higher frequency, as the component.

Furthermore, the learning unit 105 can evaluate the extracted component on the basis of a specified evaluation standard (for example, an amount of transmitted information) (318). For example, when the learning unit 105 extracts a keyword as a component from document data (text data), it evaluates the keyword by calculating an evaluation value of the keyword on the basis of the specified evaluation standard. Under this circumstance, the "evaluation value" may be, for example, a feature quantity indicative of the degree of contribution of the keyword to the combination of the reference data and the classification information (biased distribution or frequency of appearance of the component in each piece of data according to the classification information). As a result, the learning unit 105 can acquire the pattern as a learning result from the reference data on the basis of the user's input to the reference data.

The memory execution unit 201 of the business server 14 stores the component extracted by the learning unit 105, the evaluation value of the component, and a threshold value in the database 22. Next, the business server 14 evaluates whether the relation between the object data and the specified case is high or low, by comparing the component with the object data and thereby ranks the object data. Specifically speaking, the search unit 106 fetches the plurality of pieces of object data sequentially from the database 22, sequentially reads a plurality of components included in the relevant object data, and searches the object data to check whether or not each component appears in the relevant object data (320). If the relevant component appears in the object data, the operation unit 107 calculates an index of the object data on the basis of the evaluation value of the relevant component and thereby ranks the plurality of pieces of object data on the basis of the size of the index (322). Under this circumstance, ranking means, for example, associating the object data with the index calculated with respect to the relevant object data.

In the relevant processing, the operation unit 107 generates a vector that expresses whether the component included in the object data exists or not (so-called "bag-of-words"). For example, when the object data includes a keyword "price," the operation unit 107 sets "1" to the dimension of the relevant vector corresponding to the "price." The operation unit 107 calculates the above-mentioned index by calculating an inner product of the relevant vector and an evaluation value of each component (the evaluation value) (the following expression).

$$S = w^T \cdot s \qquad \text{Math. 1}$$

In the above expression, s represents the above-mentioned vector, w represents the evaluation vector, and T represents transposition.

Incidentally, the operation unit 107 can calculate one index for each piece of object data as described above or calculate one index for each unit obtained by dividing the object data at specified breaks (for example, sentences, paragraphs, partial sounds divided into a specified length, and partial videos including a predetermined number of frames) (the details will be explained later). Furthermore, the operation unit 107 can eliminate, for example, object data, which do not include a keyword(s) registered in the database 22 in advance, related terms, or components selected by the learning unit 105, from the targets of index calculation among the object data.

The classification unit 108 sets the classification information to the object data on the basis of the index indicative of the relation between the object data and the specified case (the index which makes it possible to rank the plurality of pieces of object data on the basis of the relevant relation). For example, when the index of the object data is equal to or more than a predetermined threshold value, the classification unit 108 can set the classification information to the relevant object data.

The classification unit 108 may, for example, present each of the plurality of pieces of ranked object data to a user so that the relevant user can be allowed to input the classification information to each of the plurality of pieces of object data or the user can confirm and change auto-classified classification information. As the rank of the index is higher, the degree of expectation for the object data to be related to the specified case is higher and there is a high possibility that the label "Related" or "High" (classification information) may be set to the object data; however, for example, if information which would impede the above-described situation (such as a specific word) exists in the content of the object data, there is a case where the label "Related" should not be set to the object data.

The business server 14 registers a management table of the object data in the database 22. FIG. 6 is an example of the management table which stores the object data. For example, an object data ID, the name of the object data, the index, and the classification information are recorded with respect to each piece of object data (data 1, 2, 3, and so one). Evaluation of the object data by the business server 14 includes, for example, specified arithmetic processing relating to whether the relation between the plurality of pieces of object data and the specified case is high or low by, for example, calculating the index of the object data, setting the label to each of the plurality of pieces of object data on the basis of the index, and making it possible to identify the plurality of pieces of object data on the basis of the size of the index.

The business server 14 transmits the management table stored in the database 22 to the client device 10. The client device 10 sorts and displays the object data in descending order of the size of the index. The client device 10 can, for example, present an input column to indicate whether the classification information should be assigned to the object data automatically or manually. If the user selects manual assignment, the evaluation right holding user can input the label "Related," "High," or "Non-Related" to each piece of object data. The administrator can also set, for example, a label for classification in order to indicate a specified number or specified percentage of high-rank data among the entire ranked objected data.

Learning Execution Pattern

The administrator can set a learning execution pattern to the learning unit 105 in advance. The relevant execution pattern has a plurality of embodiments such as: (1) a first embodiment in which after the classification information is input to all pieces of reference data extracted by the reference data provision unit 102, the business server 14 learns a pattern of the reference data and calculates the index with respect to all pieces of object data on the basis of the relevant pattern; (2) a second embodiment in which every time the classification information is input to each of the plurality of pieces of reference data, the business server 14 performs learning; and every time the learning is performed, the business server 14 calculates the index of the object data (specifically speaking, the business server 14 calculates the index of the object data while sequentially updating the above-mentioned pattern based on the classification of each piece of reference data); and (3) a third embodiment in which the client device 10 supplies a combination of data, which are other than the reference data extracted by the reference data provision unit 102, and the classification information to the learning unit 105 and the business server 14 calculates the index of the object data while sequentially updating the above-mentioned pattern (for example, when the evaluation right holding user sets the classification information to the object data, they update the above-mentioned pattern by feeding back the combination of the relevant object data and the classification information to the learning unit 105). In the above-mentioned second embodiment, ranking of the object data is changed every time the classification information is assigned to each piece of reference data, so that the user having a classification right can check how ranking of the object data changes and shifts. In the above-mentioned third embodiment, the classification results of the object data are sequentially reflected in the pattern obtained by the learning unit 105, so that an additional effect of being capable of sequentially enhancing data evaluation precision can further be obtained.

Re-Evaluation of Components

The learning unit 105 evaluates the degree of contribution of a plurality of components, which constitute at least part of the reference data, to combinations of the reference data and the classification information to classify the reference data in a reference data set(s) (a data set including the plurality of combinations of the reference data and the classification information to classify the reference data) as the above-mentioned evaluation value on the basis of a specified standard (for example, a transmitted information amount) as described above.

Under this circumstance, the learning unit 105 can select a component, repeatedly evaluate the evaluation value of the relevant component, and modify the evaluation value of the relevant component until the index of the data, to which the label "Related" or "High" is set becomes larger than the index of the data to which these labels are not set. Consequently, the data analysis system can find a component which appears in a plurality of pieces of data, to which the classification information "Related" or "High" is attached, and influences the combination of the data and the label. Incidentally, the transmitted information amount is calculated according to a specified definition expression by using, for example, appearance probability of specified words and appearance probability of specified classification information. Specifically speaking, the learning unit 105 calculates an evaluation value wgt of a component by using, for example, the following expression.

$$wgt_{i,L} = \sqrt{wgt_{L-i}^2 + \gamma_L wgt_{i,L}^2 - \theta} = \frac{}{\sqrt{wgt_{i,L}^2 + \Sigma_{i=1}^{L}(\gamma_L wgt_{i,L}^2 - \theta)}} \qquad \text{Math. 2}$$

In this expression, wgt represents an initial value of the evaluation value of an i-th selected keyword before learning. Furthermore, wgt represents the evaluation value of the i-th selected keyword after L-th learning; $\gamma$ represents a learning parameter for L-th learning; and $\theta$ represents a threshold value of learning effects. Consequently, the learning unit 105 can evaluate the component which expresses its characteristic of the specified classification information more, for example, when the value of the calculated transmitted information amount is larger.

Furthermore, the learning unit 105 can set an intermediate value between the lowest value of the index of the reference, to which "Related" is set, and the highest value of the index of the reference data, to which "Non-Related" is set, as a threshold value (specified reference value) used when automatically judging whether "Related" is set to the object data or not.

The learning unit 105 may continue re-evaluating the evaluation value until, for example, a recall ratio becomes a specified target value. Under this circumstance, the recall ratio is an index indicative of a ratio of data to be discovered to a predetermined quantity of data (comprehensiveness); and, for example, if the recall ratio is 80% with respect to 30% of the total data, it means that 80% of the data to be discovered (for example, lawsuit-related materials) is included in data of the top 30% rank index. If people brute-force data without using the data analysis system (linear review), the amount of data to be discovered is proportionate to the amount of data reviewed. So, as the deviation from this proportion is larger, it means better data analysis performance of the system. The operation unit 107 can have: a recall ratio calculation function that calculates the recall ratio with respect to judgment of the relation between the data and the specified case on the basis of the index of the data; and a reselection function that reselects a component from the reference data.

When the recall ratio of the ranked object data is lower than a target value, the learning unit 105 reselects a component from the reference data and ranks the object data again on the basis of the reselected component until the recall ratio exceeds the target value. When reselecting a component, the component may be selected by excluding the component that was selected last time, or part of the component selected last time may be replaced with a new component. Furthermore, when the operation unit 107 calculates the index of the object data by using the reselected component, the evaluation value(s) of one or more components may be changed. Furthermore, the operation unit 107 may calculate an index (second index) of each piece of data by using the reselected component and its evaluation value and recalculate the recall ratio by using a first index, which was obtained before the reselection of the component, and the second index.

Next, a specific example of processing for recalculating the recall ratio will be explained. Firstly, the reference data provision unit 102 randomly samples the reference data to be presented to a review (the evaluation right holding user) from the object data in the database 22. Next, the display processing unit 103 has the screen display unit of the client device 10 output the extracted reference data. The reviewer reviews the reference data displayed on the screen display unit and assigns the classification information to the reference data. The learning unit 105 analyzes the reference data and selects the component. Specifically speaking, the learning unit 105 extracts N pieces of components which appear commonly in the reference data, to which common classification information is assigned, and calculates an evaluation value for each of the extracted components. For example, it is assumed that an evaluation value of a first extracted component is Wgt1, an evaluation value of a second extracted component is Wgt2, and an evaluation value of an N-th extracted component is Wgtn. The learning unit 105 selects morphemes by using the evaluation values from Wgt1 to Wgtn. The components are rearranged in descending order of the evaluation values and m pieces of morphemes (components) are selected in descending order of the evaluation values starting from the highest evaluation value until the following expression is satisfied and its total sum reaches a target value (the target value is K where K is an arbitrary constant).

$$K = \Sigma_{i=1}^{m} wgt_i \quad \text{Math. 3}$$

K: Unique Target Value $wgt_i$: Evaluation Value of i-th Morpheme

Next, the operation unit 107 extracts data including the selected m pieces of components from the object data and calculates the index of each piece of object data on the basis of the evaluation values of the components included in the relevant object data. The operation unit 107 ranks the data in descending order of the index and decides data of the top A % index (A is an arbitrary constant) among the entire data. The operation unit 107 identifies data, which have the index equal to or more than a specified reference value and to which the same label "Related" or "High" (the classification information) as that of the reference data is set, from among the data included in A % and calculates a recall ratio X1 (Xn: the recall ratio calculated n-th time) according to a ratio of the number of pieces of data included in A % to the number of pieces of data to which the label is set.

Next, the operation unit 107 judges whether or not the recall ratio X1 is calculated as being equal to or more than the target value K. If the operation unit 107 determines that the recall ratio X1 is calculated as being equal to or more than the target value K, it terminates the processing. If the operation unit 107 determines that the recall ratio X1 is not calculated as being equal to or more than the target value K, the learning unit 105 reselects components. Specifically speaking, the learning unit 105 selects, from components obtained by excluding the m pieces of components from the previously selected N pieces of components, i pieces of components, which satisfy the following expression, in descending order of the evaluation values starting from the highest evaluation value until their total sum reaches the target value.

$$K - X_n = \Sigma_{i=m+1}^{i+m+1} wgt_i \quad \text{Math. 4}$$

K: Unique Target Value $W_i$: i-th Morpheme: Component.

$X_n$: n-th Recall Ratio

The operation unit 107 extracts the data including the reselected components, calculates a second index S1r of each piece of data, and then calculates a composite index S2 of each document according to the following formula by using a residual Δ1 (Δ1=S1r−S1) between the index S1, which was calculated at the first time, and the second index S1r.

$$S_{i+1} = \sqrt{S_i^2 + \Delta_i^2} = \sqrt{S_1^2 + \sum_{k=1}^{i} \Delta_k^2} \text{ where} \quad \text{Math. 5}$$

$$\Delta_k = \begin{cases} S_{kr} - S_k & \text{for } S_{kr} \geq S_k \\ 0 & \text{for } S_{kr} < S_k \end{cases}$$

$S_i$: i-th Index $S_{ir}$: i-th Second Index $\Delta_i$: Composite Index of i-th Index and i-th Second Index The operation unit 107 recalculates the recall ratio by using the composite index S2 and repeats recalculation of the recall ratio until the recall ratio exceeds the target value K. Consequently, it is possible to enhance the precision of data ranking to reach the target recall ratio.

Incidentally, regarding the sections which have been explained by referring to the "recall ratio," a precision rate may be used. In this case, the "precision rate" is an index indicative of a ratio (precision) of the data to be truly discovered to the data discovered by the data analysis system. For example, if the expression stating that "when 30% of the entire data is processed, the precision rate is 80%" is indicated, it means that the ratio of the data to be discovered to the data of the top 30% index ranks is 80%. Furthermore, the data analysis system can calculate the number of pieces of data required by the user to check the relevant object data on the basis of the relation between, for example, the recall ratio calculated with respect to the object data and the index rank (for example, the index rank may be a normalized rank obtained by dividing the relevant rank by the number of pieces of data).

Index Calculation in Consideration of Correlation Between Components

The operation unit 107 may decide the index of the object data in consideration of the correlation (concurrence) between an evaluation value of a first component included in the object data (the evaluation value of the first component) and an evaluation value of a second component included in the relevant object data (the evaluation value of the second component). For example, if the first component and the second component are strongly linked together and when the first component appears in the object data, the operation unit 107 can calculate the index in consideration of appearance frequency of the second component in the relevant object data. If fraud verification such as bid-rigging or cartel is assumed as a specified case with respect to such correlation, it is known experientially that respective keywords such as bidding, prices, and adjustment tend to easily appear in the same communication record data. So, the index of the object data may be increased by adding a specified value based on a combination of such data to a value obtained by adding evaluation values of the respective keywords. As a result, the data analysis system can calculate the index also in consideration of the correlation between the pluralities of components, so that the object data related to the specified case can be extracted with higher precision.

The operation unit 107 can calculate the index of the object data by having the correlation (such as concurrence) between the relevant component and another component reflected in component appearance information. The operation unit 107 multiplies, for example, an appearance management vector of the component by a correlation matrix indicative of the correlation with another component. For example, when a keyword "price" appears in the object data, the correlation matrix is a square matrix that represents easiness of appearance (that is, the correlation) of another word (such as "adjustment") with respect to the "price" by means of information of the correlation matrix.

The correlation matrix may be optimized based on the reference data. For example, when the keyword "price" appears in the object data, a value obtained by normalizing the number of appearances of another keyword ("adjustment") to between 0 and 1 (that is, a maximum likelihood estimate) is stored in the correlation matrix. Therefore, the data analysis system can obtain a correlation vector for reflecting the correlation between the pluralities of components in the index of the data.

The operation unit 107 calculates the index of the data on the basis of a value obtained by, for example, totaling all correlation vectors as indicated in the following expression. More specifically, the operation unit 107 can calculate the index of the object data by calculating an inner product of the sum of the correlation vectors and vector W of the evaluation values of the keywords instead of the aforementioned expression.

$$\text{Index: } W \cdot TFnorm\left(\sum_{s}^{N} C \cdot s_s\right) \quad \text{Math. 6}$$

In this expression, C represents the correlation matrix and $s_s$ represents an s-th keyword vector. Furthermore, TFnorm (the totaled value) is calculated as indicated in the following expression.

$$TFnorm\left(\sum_{s}^{N} C \cdot s_s\right) = \left(1 + \frac{\sum_{s}^{N}\sum_{j \ne 1}^{n} c_{1j}s_{js}}{TF_1}, 1 + \frac{\sum_{s}^{N}\sum_{j \ne 2}^{n} c_{2j}s_{js}}{TF_2}, \dots, 1 + \frac{\sum_{s}^{N}\sum_{j \ne n}^{n} c_{nj}s_{js}}{TF_n}\right)^T \quad \text{Math. 7}$$

In this expression, $TF_i$ represents appearance frequency (Term Frequency) of an i-th keyword and $s_{js}$ represents a j-th element of the s-th keyword vector.

The operation unit 107 calculates the index of each piece of object data by calculating the following expression which summarizes the above-mentioned expression.

$$\text{Index: } \sum_{i=1}^{n}\left\{w_i\left(1 + \frac{\sum_{s}^{N}\sum_{j \ne n}^{n} c_{ij}s_{js}}{TF_i}\right)\right\} \quad \text{Math. 8}$$

In this expression, $w_i$ represents an i-th element of the evaluation vector W.

Index Calculation with Respect to Each Piece of Partially-Divided Partial Data

The operation unit 107 not only ranks the data by calculating the index of the entire object data, but also ranks partial object data by, for example, dividing the object data into plurality of parts (for example, sentences or paragraphs [partial object data] included in the data) and evaluating each piece of partial data on the basis of a learned pattern (that is, calculating indexes of the partial object data). Then, the operation unit 107 can integrate the indexes of the plurality of pieces of partial object data (for example, by extracting a maximum value from the indexes of the plurality of the partial object data and thereby using it as the index of the entire data; by obtaining an average of the indexes of the plurality of pieces of partial object data and thereby using it as the index of the entire data; and by selecting and totaling a specified number of the indexes of the plurality of pieces of partial object data in descending order of the indexes starting from the highest index and thereby using the totaled value as the index of the entire data) and use the integrated index as an evaluation result of the object data. As a result, the data analysis system can adequately select useful data, which are suited for the intended use, from among the object data.

Phase Analysis

The data analysis system can analyze a phase indicative of each step of progress of a specified case. For example, if the specified case is a bid-rigging action, (it is known experientially and theoretically that) the relevant bid-rigging action normally proceeds in the order of a relation construction phase (a step in which the relation with competitors is constructed), a preparation phase (a step in which information is exchanged with the competitors), and a competitive phase (a step in which prices are presented to customers, feedback is obtained, and communications with the competitors are conducted), so that the above-mentioned three phases may be set as the above-mentioned phases. The data analysis system can identify, for example, "in which phase an analysis target organization is at present" by learning each of patterns corresponding to a plurality of preset phases from a plurality of kinds of reference data prepared for the respective phases and analyzing the object data based on each of the phases.

A flow of identification of the phases by the data analysis system will be explained in details. Firstly, the data analysis system refers to the plurality of kinds of reference data prepared respectively for the plurality of preset phases, evaluates components included in each of the relevant plurality of types of reference data, associates the relevant components with the evaluation results of the relevant components (for example, the evaluation values), and stores them in the database 22 with respect to each phase (specifically speaking, the data analysis system learns the plurality of patterns corresponding to the relevant plurality of phases). Therefore, for example, in the "relation construction phase" (phase 1), keyword evaluation values of, for example, a "schedule" and "adjustment" may be larger than those in the "execution phase" (phase 3); or in the "preparation phase" (phase 2), keyword evaluation values of, for example, "competitive products" and "investigation" may be larger than those in the "relation construction phase" (phase 1). Furthermore, in some case, different keywords may be set for different stages.

Next, the data analysis system calculates the index with respect to each of the plurality of phases by analyzing the object data on the basis of the pattern learned for each of the above-mentioned phases. Then, the data analysis system judges whether or not the relevant index satisfies a predetermined judgment standard (such as a threshold value) which is preset for each phase (for example, whether the relevant index exceeds the relevant threshold value or not); and if the data analysis system determines that the relevant index satisfies the predetermined judgment standard, it increases a count value corresponding to the relevant phase. Finally, the data analysis system identifies the present phase on the basis of the relevant count value (for example, the data analysis system identifies the phase having a maximum count value as the present phase). Alternatively, if the data analysis system determines that the index calculated for each phase satisfies the predetermined judgment standard which is set to the relevant phase, the data analysis system can identify the relevant phase as the present phase.

The data analysis system can reset the predetermined judgment standard which is set in advance (for example, a threshold value) in a data adaptive manner. In this case, the operation unit 107 uses the ranking results of the plurality of pieces of object data. The operation unit 107 can perform, for example, regression analysis of the relation between the indexes of the object data and the ranking of the indexes (that is, ranks obtained when the indexes are arranged in ascending order) and decide the threshold value on the basis of the results of the regression analysis.

The operation unit 107 can perform the above-mentioned regression analysis by using, for example, a function belonging to an exponential family ($y=e^{\alpha x}+\beta$ [where e is a base of a natural logarithm and $\alpha$ and $\beta$ are real numbers]). The operation unit 107 decides the above-mentioned values of $\alpha$ and $\beta$ on the basis of the indexes calculated with respect to the plurality of pieces of object data and the ranking of the indexes (for example, by means of a method of least squares). Incidentally, the applicant verifies a model, which uses the above-described function, by using coefficients of determination, F-tests, and t-tests and confirms validity and optimality of the relevant model.

Figure 7:
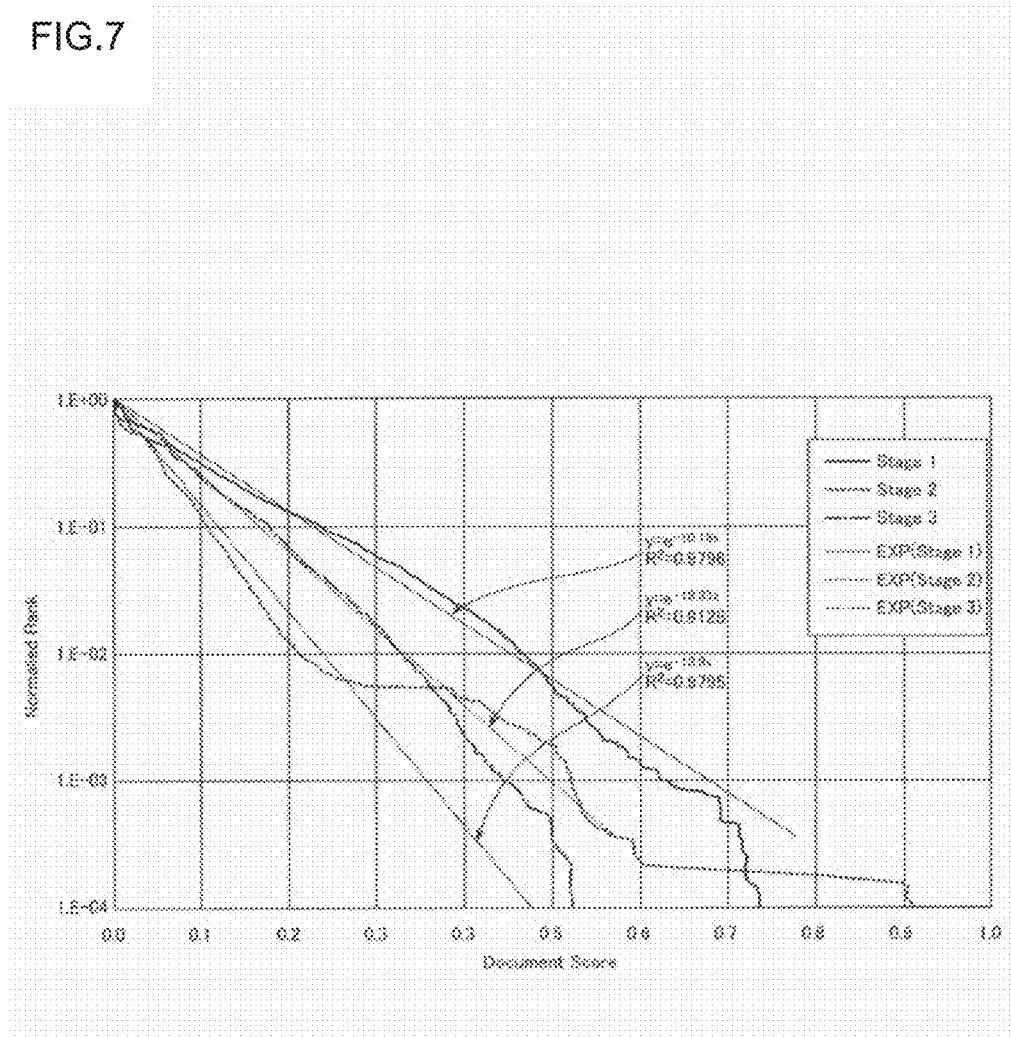
FIG. 7 is a graph illustrating a property example of an exponential model obtained by regression analysis of the object data.
Figure 8:
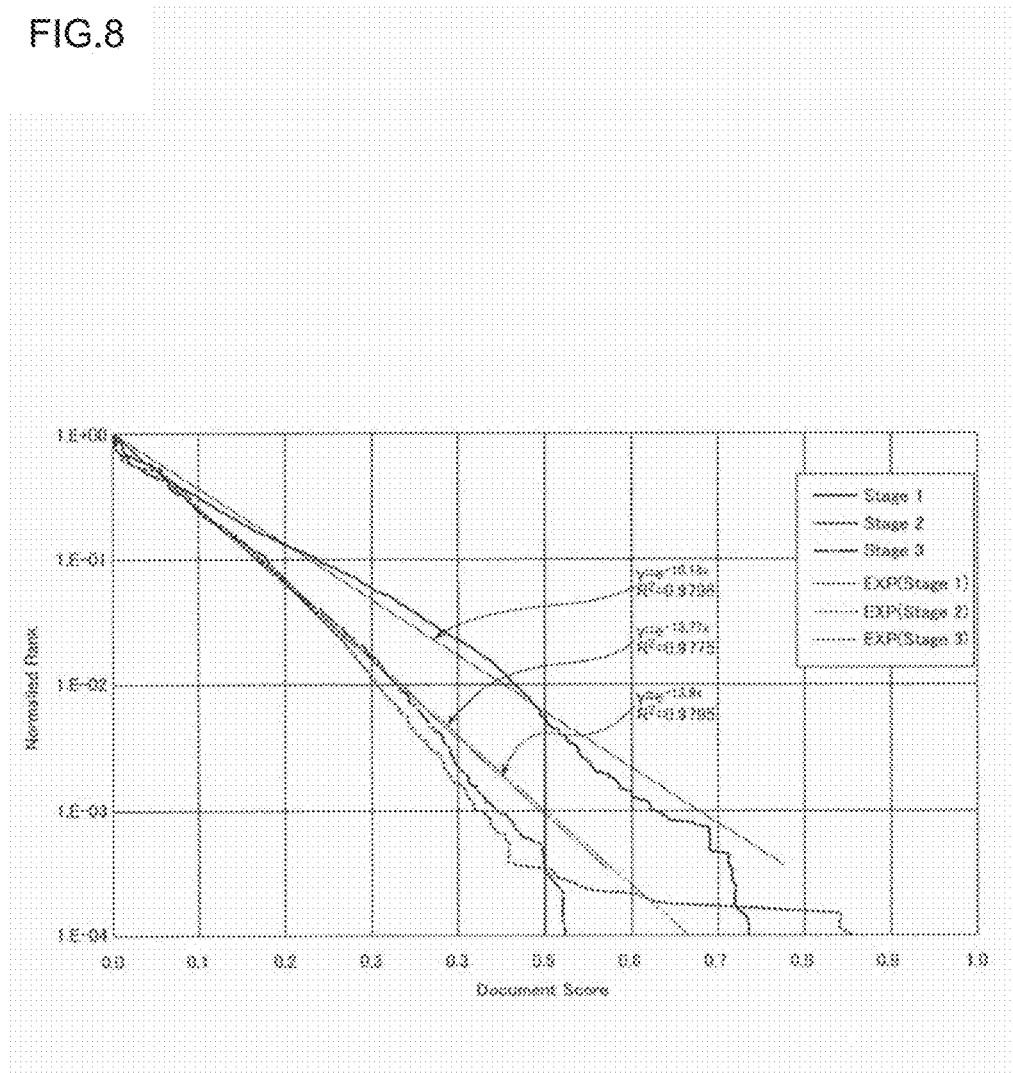
FIG. 8 is a graph illustrating a property example of the above-mentioned exponential model obtained by re-evaluation of the exponential model.

FIG. 7 is a graph illustrating a property example of an exponential model obtained by performing the regression analysis based on the indexes and the ranking. FIG. 8 is a graph illustrating a property example of the above-mentioned exponential model by re-evaluating the exponential model. Referring to FIG. 7 and FIG. 8, the horizontal axis represents the indexes and the vertical axis represents the ranking by means of logarithmic scales. Therefore, fitting curves (regression curves) which use the exponential function are indicated with straight lines in FIG. 7 and FIG. 8; and a lower part of the vertical axis indicates higher ranking and an upper part of the vertical axis indicates lower ranking.

The administrator sets a threshold value with respect to the ranking in advance. For example, referring to FIG. 7, the administrator sets 1.E-03(=0.001=0.1%) as the threshold value to the operation unit 107. The operation unit 107 can change the threshold value, which is preset to the relevant phase, by specifying the index indicated by the exponential function corresponding to the above-mentioned threshold value and setting the relevant index as a threshold value (predetermined judgment standard) for a certain phase. In this way, the data analysis system can dynamically change the threshold value (the predetermined judgment standard) for the index calculated for each phase by re-evaluating the ranked object data by means of the regression analysis so that the object data will adapt to the evaluation results on the basis of the pattern obtained by learning. Furthermore, the data analysis system can continuously monitor the progress of the phases by continuously monitoring data images of the object data.

Furthermore, when the evaluation results of the object data are verified by the evaluation right holding user, the data analysis system can adjust the learning processing executed by the learning unit 105 on the basis of the verification results. For example, when the evaluation right holding user verifies the object data, to which a high index is assigned by the data analysis system, and it is determined that the high index should not be assigned to the relevant object data, the evaluation right holding user assigns the label "Non-Related" to the relevant object data. The learning unit 105 feeds back the relevant object data as the reference data, executes relearning by, for example, increasing or decreasing the evaluation values of the components included in the relevant reference data and adding or deleting the components, and updates the pattern.

Then, the learning unit 105 re-calculates the indexes of the object data and the ranking on the basis of the updated pattern and performs the regression analysis of the relevant calculation results again (FIG. 8). The learning unit 105 sets a modified threshold value for each phase by executing the same processing as explained with reference to FIG. 7 on the basis of the results of the new regression analysis.

Analysis Using Time Series Information (1) Phase Progress Prediction Based on Prediction Model The data analysis system can predict and present the next action from the indexes decided by evaluating the plurality of pieces of object data on the basis of a model which makes it possible to predict the progress of a specified action related to the specified case. The data analysis system can assume a regression model whose variables are, for example, an index calculated for a first phase (for example, the relation construction phase) and an index calculated for a second phase (for example, the preparation phase) and predict possibility (for example, probability) to proceed to a third phase (for example, the competitive phase) on the basis of a regression coefficient which is optimized in advance.

(2) Learning at Specified Time Intervals

When analyzing data whose characteristics change as time passes (such as electronic clinical records in which the progress of the disease condition over time is recorded), the data analysis system can learn a pattern from each piece of reference data divided at every specified time interval (for example, object data for a first section, object data for a second section, and so on) (that is, by acquiring components and the evaluation results of the components at every specified time interval) and analyze the object data on the basis of each relevant pattern.

Analysis Based on Data Structure

The operation unit 107 can analyze the structure of the object data and reflect the analysis results in the evaluation of the object data. For example, when the object data at least partially include document data, the operation unit 107 can analyze an expression form of sentences in the document data (for example, whether the relevant sentence is affirmative, negative, or passive) and reflect the analysis results in the indexes of the object data. Under this circumstance, the affirmative form is, for example, when a predicate of a sentence is "taste good"; the negative form is when a predicate of a sentence is "taste bad" or "do not taste good"; and the passive form is, for example, when a predicate of a sentence is "could not say it tasted good" or "could not say it tasted bad."

The operation unit 107 can set, for example, "+α" to the affirmative form, "−β" to the negative form, and "+θ" to the passive form (α, β, and θ: they may the same numerical value or different numerical values) and adjust each calculated index with respect to the object data by using these parameters. Alternatively, when the operation unit 107 detects that a sentence included in the object data is in the negative form, it can, for example, set components included in that sentence to not to be used as the basis of calculation of the indexes (not considering the relevant components) by cancelling the relevant sentence. As a result, the data analysis system can reflect the data structure analysis results in the indexes, so that it can evaluate the data with higher precision.

The operation unit 107 can analyze syntax of sentences as the structure of the object data and reflect the analysis results in the indexes of the object data. The operation unit 107 may set superiority to the evaluation value of a morpheme depending on, for example, where in a sentence, whether a subject, an object, or a predicate of the sentence, the relevant morpheme (component) is located. The position of the morpheme in the syntax may be controlled by a vector and the superiority of the evaluation value of the morpheme is decided depending on whether the morpheme is located at the subject, the object, or the predicate. When calculating the indexes of the object data from a morpheme appearance vector and the evaluation value, the operation unit 107 can calculate the indexes of the object data by also using a control vector of the position of the morpheme in the syntax.

Feeling Analysis

The data analysis system can extract users' feelings from the object data. Generally, evaluation of products and services by the users are often described together with the users' comments at online product sites and restaurant guides. So, the data analysis system can assume whether the users are favorably impressed by the products or services by creating reference data on the basis of comments and evaluation and evaluating the object data on the basis of the reference data. Conceptually, words of favorable feelings (such as "good" and "fun") are often used in comments for products and services which are highly evaluated, while words of negative feelings (such as "bad" and "boring") are often used in comments for products and services which are poorly evaluated. Therefore, the data analysis system can learn patterns from the reference data composed of a combination of comments and evaluation and extract, as feeling indexes, feelings of the users who made the relevant comments from the object data composed of only the comments.

The classification unit 108 firstly classifies the reference data according to the superiority of feelings. For example, when consumers' evaluation is conducted in a five-point scale, the classification unit 108 sets the classification information (for example, the classification information may be two classification labels indicative of "favorable impression" or "bad impression" or five classification labels indicative of "Good," "Slightly Good," "Average," "Slightly Bad," and "Bad") to the reference data according to the scale evaluation. Next, the learning unit 105 extracts components from the reference data to which the classification information is set. Particularly, the learning unit 105 can extract the components indicative of feeling expressions (such as morphemes corresponding to adjectives, adjective verbs, and adverbs).

Then, the learning unit 105 generates a feeling marker (feeling evaluation information which is an index indicative of whether the user has a favorable impression or a bad impression) with respect to components which indicate the feeling expressions as follows. Specifically speaking, the learning unit 105 counts the number of appearances AF of a component (component A) indicative of a feeling expression in one or more pieces of reference data which are classified as the favorable impression. Then, the learning unit 105 calculates frequency RFP of appearances of component A in this reference data.

$$RF_P = \frac{A_F}{N_P} \qquad \text{Math. 9}$$

In this expression, NP represents a total number of components included in the reference data which are classified as the favorable impression.

Next, the learning unit 105 counts the number of appearances $A_N$ of a component (component A) in reference data which are classified as the bad impression and calculates frequency $RF_N$ of appearances of component A in the reference data.

$$RF_N = \frac{A_N}{N_N} \qquad \text{Math. 10}$$

In this expression, $N_N$ represents a total number of components included in the reference data which are classified as the bad impression.

Then, the learning unit 105 calculates the feeling marker (feeling judgment index value P(A)) of component A by using the frequencies calculated by the above-mentioned two expressions.

$$P(A) = \frac{RF_P}{RF_N} \qquad \text{Math. 11}$$

Furthermore, when the feeling judgment index value P(A) is more than 1, the learning unit 105 recognizes component A as a component often used for data of the favorable impression and designates "+1" as its feeling marker; and when the feeling judgment index value P(A) is less than 1, the learning unit 105 recognizes component A as a component often used for data of the bad impression, designates "−1" as its feeling marker, and stores it in the database 22. For example, "+1" tends to be assigned to words such as "good," "beautiful," and "taste good" and "−1" tends to be assigned to words such as "bad," "dirty," and "taste bad."

The operation unit 107 extracts the components, to which the feeling marker is set, from the object data and acquires a feeling marker value of each extracted component. The operation unit 107 adds the feeling marker values as many as the appearances of the components in the object data. For example, when the feeling marker which is set to the component "good" is "+1" and this component appears five times in unclassified data, a feeling index based on the component "good" in the unclassified data is decided as "5." Furthermore, for example, if the feeling marker which is set to a component "bad" is "−1" and this component appears three times in the unclassified data, the feeling index based on the component "bad" in the unclassified data is decided as "−3."

The operation unit 107 calculates the feeling index by judging whether any negative expressions or exaggerating expressions exist in the components or not. The negative expressions are expressions which deny the components and examples of such expressions are "not good" and "do not taste good." When such expressions exist, they are treated as opposite expressions; and, for example, the expression "not good" is treated as "bad" and the expression "do not taste good" is treated as "taste bad." Incidentally, they are treated as the opposite expressions in the above-described example; however, for example, if the feeling marker "+1" is set to the expression "good," this value may be changed to a negative value. Alternatively, the value which is set as the feeling marker may be decreased only by a specified amount (for example, 1.5). Furthermore, whether expressions to deny the negation, that is, double negative expressions exist or not is detected; and if there is any double negative expression, the relevant component may be judged to be affirmative.

Furthermore, the exaggerating expressions are expressions to exaggerate (emphasize) a component and examples of such expressions are "very," "awfully," and "so much." If such exaggerating expressions modify the component, the feeling index is calculated by multiplying that feeling marker value by a specified value (for example, two times). For example, if an expression "taste very good" is used and the feeling marker value for "taste good" is "+1," the feeling index of the above-mentioned expression is set to "+2" (by augmenting the value). Incidentally, the component whose feeling marker value is multiplied by the specified value is only the component modified by the exaggerating expression.

In this way, the operation unit 107 calculates the feeling indexes based on all components according to the following expression and totals them, thereby calculating index S of the object data.

$$S = \sum_{i=1}^{N} s_i \qquad \text{Math. 12}$$

In this expression, $s_i$ represents the feeling marker of an i-th component.

The operation unit 107 ranks the object data on the basis of the feeling index. If the index is more than 0, it is determined that the object data tends to cause the favorable impression; and if the index is less than 0, it is determined that the object data tends to cause the bad impression. The plurality of pieces of ranked object data are presented to the user.

Display of Heat Map

The data analysis system is equipped with a specified management function. The management function is executed by a management program of the management computer 12. An example of the management function is a mode where when there are a plurality of evaluation right holding users, each user's classification precision is displayed on a management screen.

Figure 9:
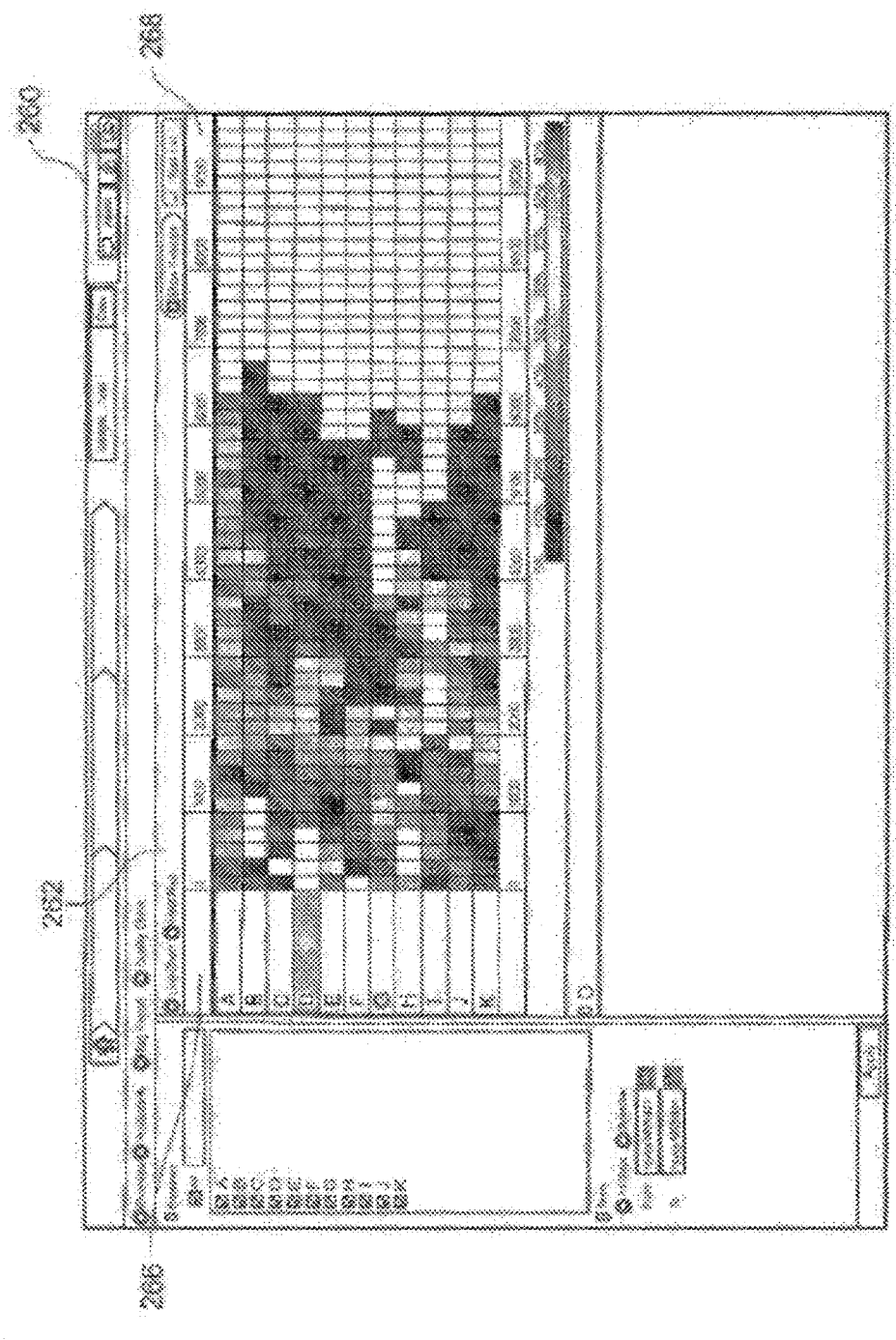
FIG. 9 is a diagrammatic illustration illustrating an example of a management screen of the data analysis system.

FIG. 9 is a diagrammatic illustration illustrating an example of the management screen of the data analysis system. The management screen is created by the display processing unit 103 according to the indexes of the data of the operation unit 107. The display processing unit 103 outputs a display screen 260 to a monitor of the management computer 12. The display screen 260 includes, for example, a display area 262 where a plurality of sections, each of which is associated with each predetermined range of the indexes, and ratios. The ratio is a ratio of the number of pieces of object data, to which the label "Related" is set by the evaluation right holding user as they are related to a specified case, among a total number of the pieces of object data included in the range of the indexes, to the total number of such pieces of object data.

Regarding the sections, for example, the indexes are divided by 1000 units like 0 to 999 and 1000 to 1999 and each section is subdivided by 200 indexes. The ratio is expressed for each subdivided subsection by means of changes of the form of additional information such as color tones (gradation). For example, colder color tones indicate a lower ratio, that is, the ratio of the object data to which the label "Related" is set by a review is low (the ratio of being Non-Related is high); and warmer color tones indicate that the ratio of the label "Related" set by the reviewer is high. For example, there is an evaluation right holding user identification column 266 in a vertical direction of the display area 262 and a relation index column 268 is distinguished for each evaluation right holding user. The data analysis system can display distribution of the relevant ratio by using the gradation according to the ratio of the data associated with the specified classification information (label) to all pieces of data so that the distribution of the relevant ratio with respect to the evaluation results of each piece of the plurality of the data can be viewed.

The management right holding user can easily recognize whether the classification precision of each evaluation right holding user is appropriate or not, by referring to the color of each subsection displayed on the display screen 260. For example, it is shown that: some evaluation right holding user has a high ratio of setting a flag "Related" although it is an area of a low index; on the other hand, some evaluation right holding user has a high ratio of setting a flag "Non-Related" although it is an area of a high index; and the classification precision of these evaluation right holding users is low.

Network Analysis

The data analysis system can visualize a correlation (such as transmission, reception, and exchange of data) between a plurality of nodes (such as persons, organizations, and computers). In this case, the display processing unit 103 can display, for example, the relation between a plurality of persons related to a specified case on the basis of data ranking results by the operation unit 107, on the client device 10 so that the degree of the relation can be recognized.

Figure 10:
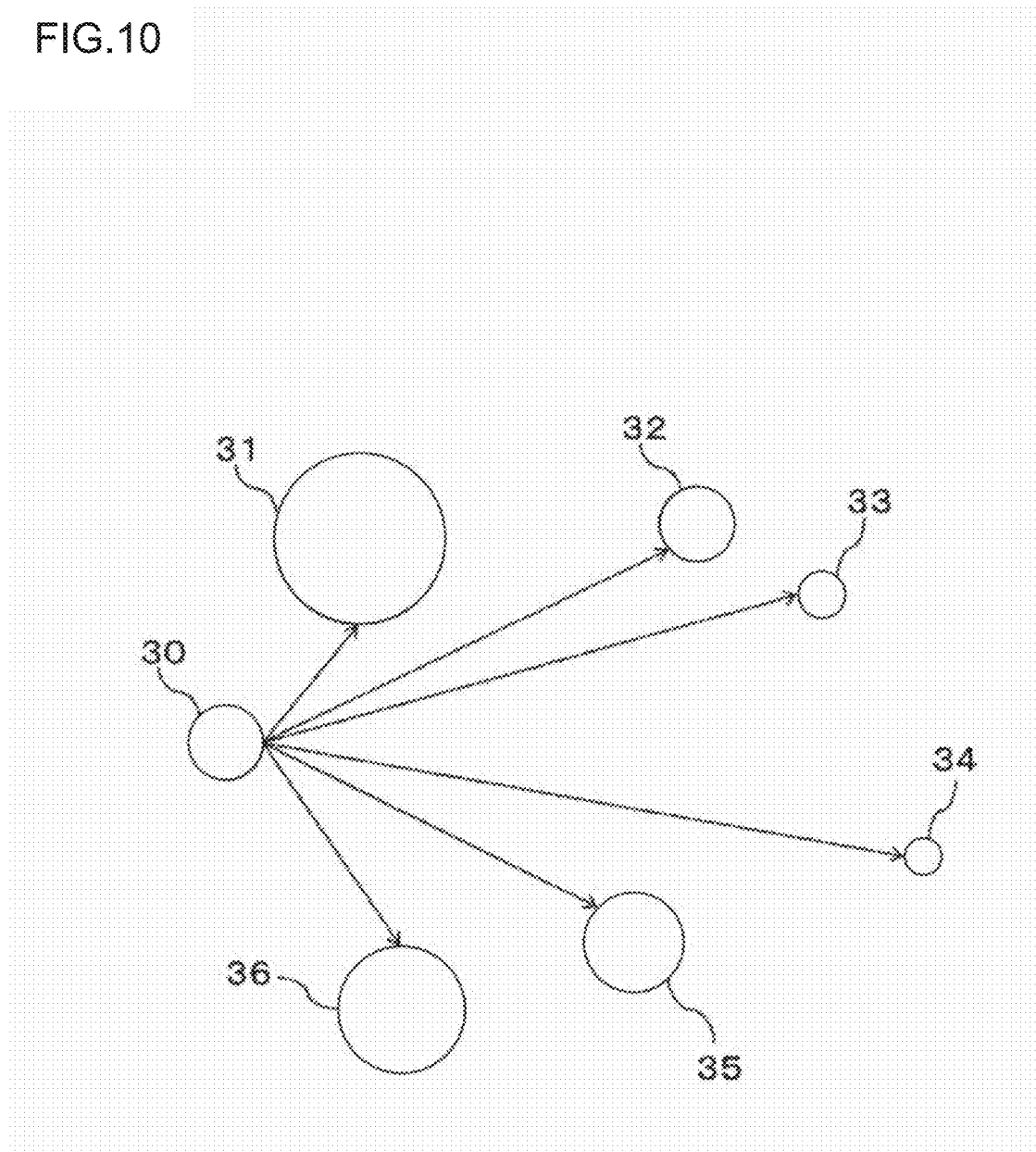
FIG. 10 is an example of a screen showing the correlation between pluralities of nodes.

The display processing unit 103 displays each node as a circle as shown in FIG. 10; and when there is a relation between one node and another node, the relevant node and the other node are displayed as they are coupled with an arrow. The size of each node represents the size of the relation between the nodes. Specifically speaking, a larger node indicates that its relation with a node 30 is higher. In an example of FIG. 10, the size of nodes reduces in the order of a node 31, a node 36, a node 35, a node 32, a node 33, and a node 34. Therefore, it is shown in the example of FIG. 10 that the relation with the node 30 becomes lower in the order of the node 31, the node 36, the node 35, the node 32, the node 33, and the node 34. The size of the relation or the size of index of the data is decided based on superiority of the label. The arrow coupling the nodes or the width, color, etc. of a line segment can also be changed instead of the size of the node or in combination therewith.

A node may be identified by a URL or an e-mail address. FIG. 10 displays the correlation centered on the node 30, but the display processing unit 103 can also change a central node. Furthermore, the display processing unit can also set a plurality of nodes as central nodes in one screen. Furthermore, time information of the data such as time stamps, transmission time, reception time, and update time can also be displayed so that the correlation between the nodes can be recognized. As the occurrence of the correlation between the nodes is closer to the present time, the form (color tone) to display the connection between the nodes may be changed.

Furthermore, the data analysis system judges whether a first component which represents a specified action is included in the data or not; and if it is determined that the first component is included in the data, the data analysis system identifies a second component which represents a target of the specified action. For example, if a text "determine specifications" is included in the above-mentioned data, the data analysis system extracts components (words) "specifications" and "determine" from the relevant text and identifies the second component (object) "specifications" which is the target of the first component (verb) "determine" representing the specified action. Next, the data analysis system associates meta information (attribute information), which indicates the attributes (properties or characteristics) of the data including the first component and the second component, with the first component and the second component. Under this circumstance, the above-mentioned meta information is information indicative of specified attributes of the data; and, for example, if the above-mentioned data is an e-mail, the meta information may be the name of a person who sent the relevant e-mail, the name of a person who received the e-mail, mail addresses, and dates and times of transmission and reception. Then, the data analysis system associates the two components with the meta information and display them on the client device 10.

For example, when a text "exchange technology" is included in an e-mail (data or communication information) and words "technology" (the second component) and "exchange (the first component) are extracted, the data analysis system displays the words "technology" and "exchange" by associating them with the names of persons who sent and received the relevant e-mail (for example, "person A" and "person B"). As a result, it is possible to assume that "person A" and "person B" are planning to "exchange" certain "technology." Furthermore, for example, if the text "determine specifications" is included in presentation materials attached to the above-mentioned e-mail and the words "specifications" (the second component) and "determine" (the first component) are extracted, the data analysis system displays the above-mentioned words "specifications" and "determine" by associating them with the date and time when the above-mentioned presentation materials were prepared (for example, 16:30 on Mar. 30, 2015). As a result, it is possible to assume that while "person A" and "person B" are planning to "exchange" the certain "technology," they were going to "determine" the "specifications" of the relevant "technology" as of 16:30 on Mar. 30, 2015.

Although the plurality of pieces of object data are ranked by the data analysis system according to the present invention, it takes time to look through the content of the entire object data and it is not easy to do. So, the data analysis system can implement a support function to enable the user to comprehend the content of the object data in short time.

Concept Extraction

Figures 11A, 11B:
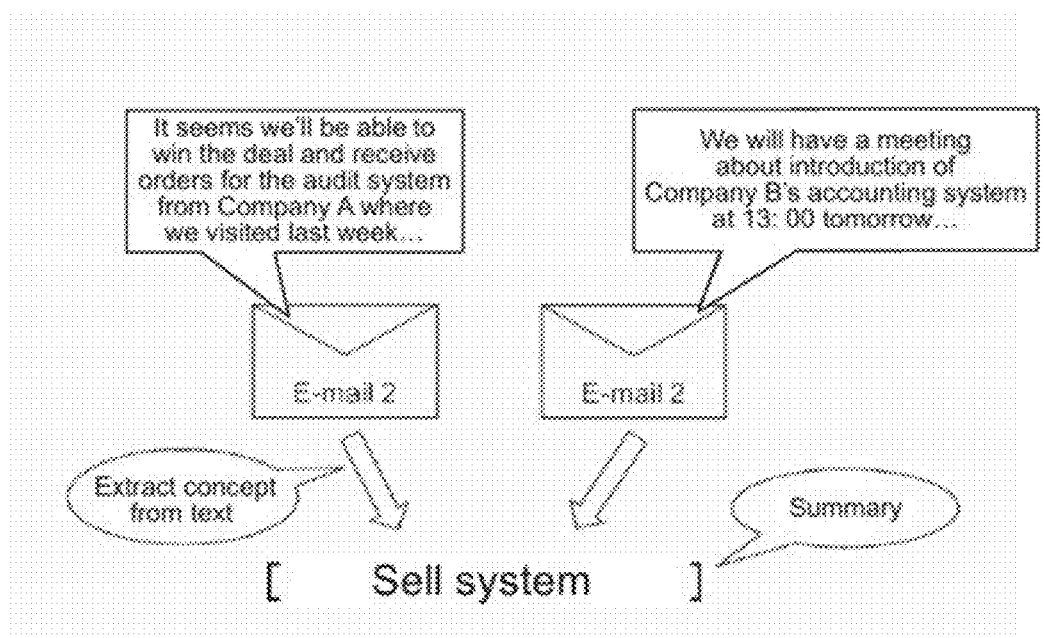
FIG. 11(A) is a conceptual diagram illustrating creation of a summary of the object data and FIG. 11(B) is a schematic diagram illustrating an example of a display format of a classification result.

The operation unit 107 executes a topic (context) detection function. The operation unit 107 extracts data including components of subordinate concepts of previously-selected concepts from the object data as illustrated in FIG. 11(A), create a summary of the content of each piece of extracted object data (such as e-mail) to an appropriate level of abstraction, clusters the object data so as to be able to check the content of the object data on the basis of the created summary, and presents the clustering results of the object data to the user in a format as illustrated in, for example, FIG. 11(B).

Such a topic detection function is implemented in two phases, that is, a preparation phase and an application phase. The preparation phase is a phase to extract only keywords of the subordinate concepts of each object concept, which was set by the user in advance, and create the above-mentioned object concept extraction database in which each of the extracted keywords is associated with its corresponding object concept. Furthermore, the application phase is a phase to create the summary, by which the content of the relevant object data is expressed with superordinate concepts by using the object concept extraction database created in the preparation phase, cluster the relevant object data on the basis of the created summary, and display the clustering results in response to the user's request.

Figure 12:
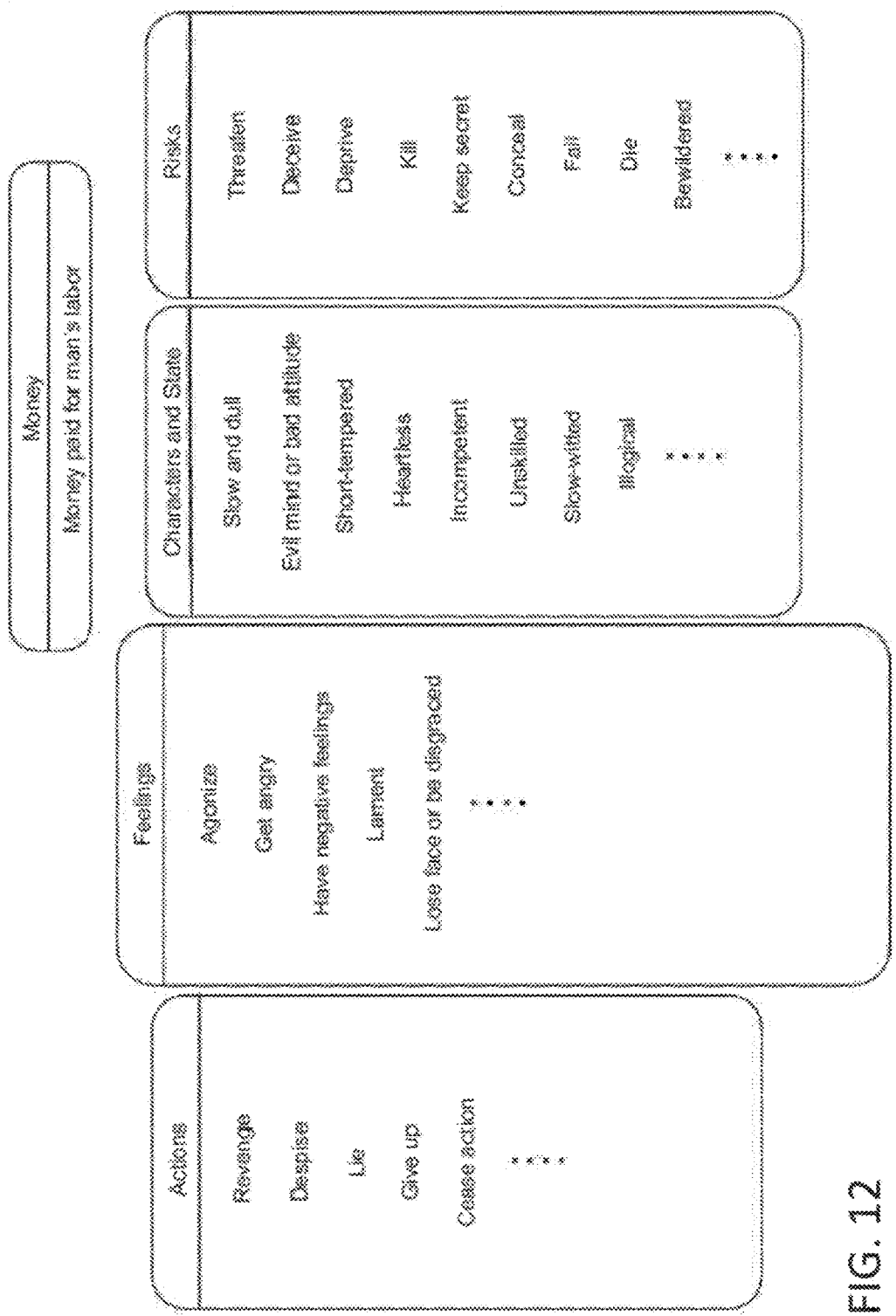
FIG. 12 is a conceptual diagram for explaining object concepts.

In the preparation phase, the user: firstly selects some object concepts according to an issue (topic) which the user wishes to detect from the object data; and registers the selected object concepts in the data analysis system in advance. For example, when the topics to be detected are "injustice" and "unsatisfaction," concept categories are divided into five categories such as "Actions," "Feelings," "Characters and State," "Risks," and "Money"; and, for example, concepts such as "Revenge" and "Despise" are set as object concepts to the "Actions"; concepts such as "Agonize" and "Get Angry" are set as object concepts to the "Feelings"; concepts such as "Slow and Dull" and "Evil Mind or Bad Attitude" are set as object concepts to the "Characters and State"; concepts such as "Threaten" and "Deceive" are set as object concepts to the "Risks"; and concepts such as "Money Paid for Man's Labor" are set as object concepts to the "Money" as illustrated in FIG. 12.

Once the object concepts are set as described above, the operation unit 107 searches dictionaries of the database 22 for keywords expressing the subordinate concepts of each of the registered object concepts and creates the aforementioned object concept extraction database by associating the individual keywords detected as a result of the search with their corresponding object concepts.

On the other hand, in the application phase, the operation unit 107 extracts object data, which include the keywords registered in the object concept extraction database in a text, from the object data by using the object concept extraction database created as described above. Furthermore, the operation unit 107 creates a summary of the content of the text with respect to the thus-extracted object data by using the superordinate concepts of the then-detected keywords.

For example, in the case of FIG. 11 as illustrated in (A), object concepts "system," "sell," and "perform" are extracted from a section "receive orders for monitoring system" with respect to "e-mail_1" and superordinate concepts "system," "sale," and "perform" are extracted from a section "introduction of accounting system" with respect to "e-mail_2." Therefore, the summary of "sell/perform system" is created with respect to both these "e-mail_1" and "e-mail_2."

Subsequently, in response to a request from the user, the display processing unit 103 clusters the object data on the basis of the thus-created summary of the relevant object data and presents the clustering results to the user.

For example, in the case of FIG. 11, the same summary "sell/perform system" is created for both "e-mail_1" and "e-mail_2" as described above, so that these "e-mail_1" and "e-mail_2" are classified in the same group. Then, this classification result is displayed in the format where the summary is the "content" as illustrated in, for example, (B). In this way, the user can comprehend the content of the object data.

Other Configurations

The classification information accepting unit 104 sets a combination of the reference data and the classification information with respect to each of the plurality of pieces of classification information. Specifically speaking, a plurality of combinations of the classification information and the reference data are set. Furthermore, the learning unit 105 evaluates, for example, components which appear commonly in the plurality of pieces of reference data with the same classification information assigned thereto, in consideration of the degree of contribution to the combinations of the reference data and the classification information and selects the components, whose evaluation result (the evaluation value) is equal to or more than a specified value, as one of patterns which are common to the plurality of pieces of reference data. Incidentally, since policies and standards for evaluation and classification of the reference data may sometimes vary for each evaluator, the data analysis system may permit a plurality of evaluators to participate in the evaluation and classification of the reference data.

The data analysis system may set the classification information to the ranked object data on the basis of the user's input. Alternatively, the data analysis system may assign the classification information to the relevant object data according to the evaluation results of the object data (for example, when the index of the object data satisfies the relevant specified evaluation standard [for example, whether the index exceeds a predetermined threshold value or not]) without requiring the user's input. The above-mentioned evaluation standard may be set by the user having the management right or may be set by the data analysis system on the basis of the results of regression analysis of measurement results of the reference data or the object data. Furthermore, the data analysis system can extract, for example, useful components from a plurality of pieces of object data, which are classified according to specified classification information and to which the same classification information is assigned, and analyze whether or not the object data can be classified in the same manner as the reference data on the basis of the relevant components. The components can be extracted, for example, for each group of object data which are grouped according to each of the plurality of pieces of classification information.

Components such as morphemes which are selected by the learning unit 105 are recorded in the database 22 as described earlier. Furthermore, the business server 14 can register components, which can be classified as "Related" if their superiority relation with the specified case is high based on the result of the classification processing in the past and they are included in the object data, in the database 22 in advance.

Furthermore, it is also possible to register components highly related to object data, to which reference numerals relating to the relation with the specified case are assigned based on the classification processing results in the past, in the database 22. Morphemes which are registered in the database 22 once can be increased or decreased based on the results of learning conducted by the data analysis system or additional registration and deletion of morphemes can otherwise be performed manually.

The data analysis system can learn a plurality of patterns (combinations of components of the data and the evaluation results of the components) and retain them in the database 22. For example, the data analysis system can retain the above-mentioned combinations for each type of specified cases. Consequently, the data analysis system retain mutually different patterns between, for example, a case where the data analysis system is implemented as a criminal investigation support system and analyzes data which can be evidence of crimes and a case where the data analysis system is implemented as an Internet application system and analyzes web pages. Under this circumstance, the user inputs the type of the relevant specified case, so that the data analysis system can process the object data on the basis of a pattern according to the relevant type.

When calculating evaluation values of components included in the reference data, the data analysis system can calculate final evaluation values by calculating assumed evaluation values of all the components and then taking the assumed evaluation values of components other than the relevant components into consideration in addition to the assumed evaluation values of the target components whose evaluation values are to be calculated. Specifically speaking, the data analysis system: calculates an evaluation value of each of the plurality of components (that is, evaluates each of the plurality of components) and updates the evaluation value calculated for a first component, which is one of the plurality of components, so that the evaluation value calculated for a second component which is another one of the plurality of components will be reflected in the evaluation value calculated for the first component; associates the updated evaluation value with the first component; and stores the evaluation value of the first component in the database 22. As a result, the data analysis system can calculate the evaluation value of a component to evaluate the data in consideration of the relation with another component and thereby analyze the data with higher precision.

The data analysis system evaluates each component included in the reference data on the basis of the specified standard (such as the transmitted information amount) and calculates a positive index (primary index) indicative of whether the relation with the specified case is high or low, with respect to each piece of object data on the basis of the relevant evaluation results. Next, the data analysis system selects a predetermined quantity of data (for example, randomly) as partial data from the object data whose above-mentioned positive index is low (for example, data whose positive index is almost zero) and then evaluates each component included in the selected data on the basis of the specified standard. Then, the data analysis system calculates a negative index (secondary index) indicative of a low relation with the object data and the above-mentioned specified case with respect to the relevant object data on the basis of the evaluation results. Finally, the data analysis system extracts the object data according to the above-mentioned positive index and negative index (for example, by ranking the entire data so that the data are arranged in descending order of the positive index and in ascending order of the negative index).

The data analysis system derives not only the index indicative of the relation with the specified case (the positive index), but also the index indicative of no relation with the specified case (the relation with the specified case is low) (the negative index) as described above. As a result, the data analysis system can analyze the data with higher precision.

Application Examples of Data Analysis System

The data analysis system can be implemented as, for example, an information asset utilization system (project evaluation system). Specifically speaking, this data analysis system can be implemented as a system capable of utilizing information assets (data) owned by companies and experts by extracting the information assets (data) depending on the situation (dynamically). As a result, for example, (1) information about products developed in the past can be reused according to requirements of the development in order to improve the efficiency of a development site for which shortening of a development term is desired; and (2) useful information assets can be identified on the basis of specialized knowledge of experienced engineers. Specifically speaking, the data analysis system can efficiently discover necessary information (the information assets in the past) for the user.

The data analysis system can be implemented as, for example, an Internet application system (such as a SmartMail system, an information aggregation [curation] system, a user monitoring system, or a social media management system). In this case, the data analysis system evaluates data (such as messages posted by the user on an SNS, information of recommendations posted on web sites, and the user or organization's profile information) on the basis of a specified evaluation standard (for example, whether the relevant user's tastes are similar to another user's tastes or not, or whether the relevant user's tastes match restaurants' attributes or not) and can thereby, for example, display a list of other users who might get along with the relevant user, present information of restaurants which would suit the user's tastes, or give a warning about organizations which might possibly cause harm to the user. Specifically speaking, the data analysis system can efficiently discover necessary information for the user.

Furthermore, the data analysis system can be implemented as, for example, a driving support system. In this case, the data analysis system evaluates data (such as data obtained from, for example, a car-mounted sensor, a camera, and a microphone) on the basis of a specified evaluation standard (for example, whether or not it is information to which an experienced driver paid attention while the experienced driver was driving a car) and can thereby, for example, automatically extract useful information which can make driving safe and comfortable. Specifically speaking, the data analysis system can efficiently discover necessary information for the user.

Furthermore, the data analysis system can be implemented as, for example, a financial system (such as an unfair trade monitoring system or a stock price prediction system). In this case, the data analysis system evaluates data (such as documents filed to banks and market values of stock prices) on the basis of a specified evaluation standard (for example, whether there is any possibility of a fraudulent purpose or not, or whether the stock prices will increase or not) and can thereby, for example, detect notification filed for the fraudulent purpose or predict the stock prices in the future. Specifically speaking, the data analysis system can efficiently discover necessary information for the user.

Furthermore, the data analysis system can be implemented as a medical application system (such as a pharmacovigilance support system, a clinical trial efficiency improvement system, a medical risk hedge system, a fall-prediction [fall-prevention] system, a prognosis prediction system, or a diagnostic support system). In this case, the data analysis system evaluates data (such as electronic health records, nursing records, and patients' diaries) on the basis of a specified evaluation standard (for example, whether a patient will take a specified dangerous action or not, or whether the efficacy of a certain drug on disease has been proved or not) and can thereby, for example, predict that the patient might fall into a dangerous state (for example, the patient might fall down), or can evaluate the efficacy of the drug objectively. Specifically speaking, the data analysis system can efficiently discover necessary information for the user.

Furthermore, the data analysis system can be implemented as, for example, a mail control system (SmartMail system). In this case, the data analysis system can evaluate data (such as e-mails and attached files) on the basis of a specified evaluation standard (for example, whether it is necessary to respond to the relevant e-mail or not) and can thereby, for example, extract important mails (mails that require any actions) from a large amount of mails. Specifically speaking, the data analysis system can efficiently discover necessary information for the user.

Furthermore, the data analysis system may be implemented as, for example, a discovery support system. In this case, the data analysis system can evaluate data (such as documents, e-mails, and spreadsheet data) on the basis of a specified evaluation standard (for example, whether or not the relevant data should be filed in discovery procedures of the relevant lawsuit) and can thereby, for example, file only the documents related to the relevant lawsuit. Specifically speaking, the data analysis system can efficiently discover necessary information for the user.

Furthermore, the data analysis system can be implemented as, for example, a forensic support system. In this case, the data analysis system can evaluate data (such as documents, e-mails, and spreadsheet data) on the basis of a specified evaluation standard (for example, whether or not the relevant data are evidence which can prove a criminal action) and can thereby, for example, extract the evidence which can prove the relevant criminal action. Specifically speaking, the data analysis system can efficiently discover necessary information for the user.

Furthermore, the data analysis system can be implemented as, for example, a mail monitoring system (mail monitoring support system). In this case, the data analysis system can evaluate data (such as e-mails and attached files) on the basis of a specified evaluation standard (for example, whether a user who transmitted or received the relevant e-mail intends to conduct an illicit act or not) and can thereby, for example, discover a prior warning of the illicit act such as information leakage or bid-rigging. Specifically speaking, the data analysis system can efficiently discover necessary information for the user.

Furthermore, the data analysis system can be implemented as, for example, an intellectual property evaluation system. In this case, the data analysis system can evaluate data (such as patent publications, documents which summarize inventions, and academic papers) on the basis of a specified evaluation standard (for example, whether or not the relevant patent publication can be evidence to reject or invalidate a given patent) and can thereby, for example, extract invalidation materials from a large amount of documents (such as patent publications, academic papers, and texts posted on the Internet). Under this circumstance, the data analysis system can evaluate the relevant object data by, for example, acquiring combinations of each claim of a target patent to be invalidated and the label "Related" (the classification information) and combinations of each claim of patents, which are different from, and are not related to, the relevant patent, and the label "Non-Related" (the classification information) as the reference data, learning patterns from the relevant reference data, and calculating indexes with respect to a large number of documents (the object data) (for example, by calculating an index for each paragraph of a patent publication, totaling a specified number of the relevant high-ranked indexes, and then using the totaled index as an index of the relevant patent publication). Specifically speaking, the data analysis system can efficiently discover necessary information for the user.

Furthermore, the data analysis system can be implemented as, for example, a call center escalation system. In this case, the data analysis system can evaluate data (such as telephone call records and recorded voices) on the basis of a specified evaluation standard (for example, whether or not they are similar to past handled cases) and can thereby, for example, extract the best appropriate methods of handling the case for the current situation from among the past handled cases. Specifically speaking, the data analysis system can efficiently discover necessary information for the user.

Furthermore, the data analysis system can be implemented as, for example, a marketing support system. In this case, the data analysis system can evaluate data (such as companies' or individual persons' profiles and product information) on the basis of a specified evaluation standard (for example, whether the relevant individual person is a male or a female or whether consumers have positive feelings about the product or not) and can thereby, for example, extract the market's evaluation of a certain product. Specifically speaking, the data analysis system can efficiently discover necessary information for the user.

Furthermore, the data analysis system can be implemented as, for example, a credit investigation system. In this case, the data analysis system can evaluate data (such as company profiles, information about companies' business results, information about stock prices, and press releases) on the basis of a specified evaluation standard (for example, whether the relevant company will become bankrupt or not or whether the relevant company will grow or not) and can thereby, for example, predict the growth and bankruptcy of the company. Specifically speaking, the data analysis system can efficiently discover necessary information for the user.

Accordingly, the data analysis system according to the present invention can be implemented as an arbitrary system which efficiently discovers necessary information for the user by evaluating data on the basis of the specified evaluation standard (whether such data is related to the specified case or not), such as the discovery support system, the criminal investigation support system, the e-mail monitoring system, the medical application system, the Internet application system, the information asset utilization system, the marketing support system, the intellectual property evaluation system, the call center escalation system, the credit investigation system, the business support system, or the driving support system. Particularly, the data analysis system according to the present invention can efficiently discover necessary information for the user by: extracting patterns from the data by recognizing a group of data including a plurality of pieces of data as an "aggregate of data as a result of human thoughts and behaviors" and conducting, for example, analysis related to the human behaviors, analysis to predict the human behaviors, analysis to detect a specified human behavior, and analysis to suppress a specified human behavior; and evaluating the relation between the relevant pattern and the specified case.

Incidentally, depending on a field to which the data analysis system according to the present invention is applied, preprocessing (for example, by extracting important parts from the relevant data and using only the important parts as targets of data analysis) may be executed on the data or a mode to display the results of the data analysis may be changed in consideration of the circumstances specific to the relevant field. Those skilled in the art understand that many variations as described above can exist; and all the variations are included in the scope of the present invention.

Examples where Data Analysis System Processes Data Other than Document Data

The aforementioned embodiment has mainly described the case where the data analysis system analyzes document data; however, the data analysis system can analyze data other than the document data (such as sound data, image data, and video data).

For example, when analyzing the sound data, the data analysis system may use the relevant sound data themselves as analysis targets or convert the sound data into document data by means of sound recognition and then use the document data after the conversion as the analysis targets. In the former case, the data analysis system can analyze the sound data by, for example, dividing the sound data into partial sounds of a specified length, using them as components, and identifying the partial sounds by using an arbitrary sound analysis method (such as a hidden Markov model or a Kalman filter). In the latter case, the data analysis system can analyze the sound data by recognizing the sounds by using an arbitrary sound recognition algorithm (for example, a recognition method using the hidden Markov model) and applying the same procedures as those explained in the embodiment to the recognized data.

Furthermore, when analyzing the image data, the data analysis system can analyze the image data by, for example, dividing the image data into partial images of a specified size, using them as components, and identifying the partial images by using an arbitrary image recognition method (such as pattern matching, a support vector machine, or a neural network).

Furthermore, when analyzing the video data, the data analysis system can analyze the video data by, for example, dividing each of a plurality of frame images included in the video data into partial images of a specified size, using them as components, and identifying the partial images by using an arbitrary image recognition method (such as pattern matching, a support vector machine, or a neural network).

Implementation Examples by Software and Hardware

The control block of the data analysis system may be implemented by a logical circuit (hardware) formed in, for example, an integrated circuit (IC chip) or may be implemented by software by using a CPU (Central Processing Unit). In the latter case, the data analysis system includes, for example: the CPU that executes programs which are software implementing each function (control programs of the data analysis system); a ROM (Read Only Memory) or a storage device (they are referred to as the "storage media") in which the relevant programs and various types of data are recorded so that they can be read by the computer (or the CPU); and a RAM (Random Access Memory) for expanding the relevant programs. Then, the object of the present invention is achieved by the computer (or the CPU) reading the programs from the above-mentioned storage media and executing them. "Tangible media which are not temporary"

such as tapes, disks, cards, semiconductor memories, and programmable logical circuits can be used as the above-mentioned storage media. Furthermore, the above-mentioned programs may be supplied to the computer via an arbitrary transmission medium capable of transmitting the programs (such as a communication network or a broadcast wave). The present invention can also be implemented in a form of a data signal which is embodied by electronic transmission of the above-mentioned programs and embedded in a carrier wave. Incidentally, the above-mentioned programs can be implemented by an arbitrary programming language and can be implemented by using, for example, a script language such as Python, ActionScript, or JavaScript (registered trademark), an object-oriented programming language such as Objective-C or Java (registered trademark), or a markup language such as HTML5. Furthermore, any storage media (computer-readable storage media) in which the above-mentioned programs are recorded are within the scope of the present invention.

Summary

A data analysis system according to a first embodiment of the present invention is a data analysis system for evaluating object data, the system including a memory, an input control device, and a controller, wherein the controller: evaluates each of a plurality of pieces of object data, the evaluation corresponding to a relation between each piece of the object data and a specified case; generates an index that enables ranking of the plurality of pieces of object data, by means of the evaluation; and is capable of changing the index based on an input entered by a user via the input control device; wherein the memory at least temporarily stores the plurality of pieces of object data evaluated by the controller; wherein the input control device permits the user to enter the input in order for the controller to rank the plurality of pieces of object data, where the ranking of the plurality of pieces of object data changes according to the index that changes based on the input, the input is to classify reference data which is different from the plurality of pieces of object data, on the basis of a relation between the reference data and the specified case, the classification is executed according to a plurality of pieces of classification information according to the content of the reference data, and at least one of the plurality of pieces of classification information is assigned by the input to the reference data; and the input control device presents the reference data to the user; and the input control device provides the controller with a combination of the at least one piece of the classification information, which is assigned to the presented reference data by means of the input by the user, and the reference data; and wherein the controller: extracts a pattern that characterizes the reference data from the reference data according to the classification information assigned by the input by evaluating a degree of contribution of each of a plurality of components contained in the reference data to the combination provided by the input control device; determines the index by evaluating the relation between the object data and the specified case on the basis of the extracted pattern; sets the determined index to the object data; ranks the plurality of pieces of object data according to the index; and reports the plurality of pieces of ranked object data to the user.

Furthermore, in the first embodiment regarding a data analysis system according to a second embodiment of the present invention, the controller compares the index with a predetermined threshold value and sets the classification information related to the specified case to each of the plurality of pieces of object data based on a result of the comparison.

Furthermore, in the first or second embodiment regarding a data analysis system according to a third embodiment of the present invention, the controller: judges whether the plurality of pieces of object data satisfy a predetermined judgment standard; selects a predetermined quantity of the object data from the plurality of pieces of object data determined to satisfy the predetermined judgment standard; re-evaluates each of the predetermined quantity of the object data based on the pattern; and changes the predetermined judgment standard based on a result of the re-evaluation.

Furthermore, in the first to third embodiments regarding a data analysis system according to a fourth embodiment of the present invention, the controller: further acquires a combination of new reference data and the classification information assigned to the new reference data; updates the pattern by evaluating the degree of contribution of at least some component of the new reference data to the combination of the new reference data and the classification information; and determines the index by evaluating the relation between the object data and the specified case based on the updated pattern.

Furthermore, in the first to fourth embodiments regarding a data analysis system according to a fifth embodiment of the present invention, the controller: calculates a recall ratio based on a result of the evaluation of the plurality of pieces of object data; and repeatedly extracts the pattern from the reference data so that the recall ratio will increase.

Furthermore, in the first to fifth embodiments regarding a data analysis system according to a sixth embodiment of the present invention, every time the combination is provided from the input control device, the controller sequentially updates the pattern by evaluating the degree of contribution of at least some component of the reference data corresponding to the classification information to the combination.

Furthermore, in the first to sixth embodiments regarding a data analysis system according to a seventh embodiment of the present invention, the controller: extracts a concept corresponding to at least some component of the object data by referring to a database in which the component is associated with the concept; and outputs a summary of the plurality of pieces of object data based on the extracted concept.

Furthermore, in the first to seventh embodiments regarding a data analysis system according to an eighth embodiment of the present invention, the controller clusters the plurality of pieces of object data with respect to each subject commonly included in the plurality of pieces of object data.

Furthermore, in the first to eighth embodiments regarding a data analysis system according to a ninth embodiment of the present invention, the object data includes at least the user's evaluation information about the specified case; and wherein the controller extracts a feeling of the user who generated the object data, the feeling caused about the specified case on the basis of the evaluation information, from the object data.

Furthermore, in the first to ninth embodiments regarding a data analysis system according to a 10th embodiment of the present invention, the controller uses gradation according to a ratio of the object data associated with the classification information to the entire object data and displays distribution of the ratio in a visible manner with respect to the evaluation result of each of the plurality of pieces of object data.

Furthermore, in the first to 10th embodiments regarding a data analysis system according to an eleventh embodiment of the present invention, the plurality of pieces of object data is information transmitted and received between a plurality of computers; and wherein the controller visualizes closeness between the plurality of computers on the basis of a result of analysis of the transmitted and received information.

Furthermore, in the first to 11th embodiments regarding a data analysis system according to a 12th embodiment of the present invention, the pattern can change according to elapse of time; and wherein the controller: acquires the reference data at every specified time interval; extracts the pattern from each of the plurality of pieces of reference data acquired at the every specified time interval; and determines the index by evaluating each of the plurality of pieces of object data at the every specified time interval on the basis of the pattern.

Furthermore, in the first to 12th embodiments regarding a data analysis system according to a 13th embodiment of the present invention, the controller: generates a plurality of partial object data constituting at least part of the object data by dividing the object data; evaluates each of the plurality of the partial object data on the basis of the extracted pattern; integrates the index obtained by evaluating the plurality of the partial object data; and evaluates each of the plurality of pieces of object data by using the integrated index.

Furthermore, in the first to 13th embodiments regarding a data analysis system according to a 14th embodiment of the present invention, the controller: calculates an evaluation value with respect to the component on the basis of strength of relation between the component and the classification information, which classifies the reference data including the component, as a result of evaluation of the degree; and evaluates the plurality of pieces of object data by determining the index to indicate whether the object data is highly or lowly related with the specified case, on the basis of the evaluation value calculated for at least some component of the object data.

Furthermore, in the first to 14th embodiments regarding a data analysis system according to a 15th embodiment of the present invention, the controller: evaluates a correlation between the component and another component, which is different from the component, based on frequency at which the component and the other component appear in at least part of the same reference data; and further evaluates each of the plurality of pieces of object data on the basis of the correlation.

Furthermore, in the first to 15th embodiments regarding a data analysis system according to a 16th embodiment of the present invention, the controller presents a next action from the index determined by evaluating the plurality of pieces of object data on the basis of a model capable of predicting progress of a specified action related to the specified case.

Furthermore, in the first to 16th embodiments regarding a data analysis system according to a 17th embodiment of the present invention, the controller: evaluates the plurality of pieces of object data at every phase that is an index indicative of each step of progress of a specified action; and identifies a present phase from an index determined for each phase by evaluating the plurality of pieces of object data.

Furthermore, in the first to 17th embodiments regarding a data analysis system according to a 18th embodiment of the present invention, the object data is document data at least partially including one or more sentences; and wherein the controller analyzes a structure of the sentence and determines the index of the object data on the basis of a result of the analysis.

Furthermore, in the 18th embodiment regarding a data analysis system according to a 19th embodiment of the present invention, the controller judges an expression form of the sentence on the basis of the analysis result of the structure of the sentence and evaluates the object data on the basis of a result of the judgment.

Furthermore, a data analysis method according to the first embodiment of the present invention is a data analysis method for evaluating object data, wherein the data analysis method includes: a first step of evaluating each of a plurality of pieces of object data on the basis of an evaluation standard, the evaluation standard corresponding to a relation between each piece of the object data and a specified case; a second step of generating an index that enables ranking of the plurality of pieces of object data, by means of the evaluation and being capable of changing the index based on an input entered by a user; a third step of at least temporarily storing the plurality of pieces of object data evaluated in the first step; a fourth step of permitting the user to enter the input in order to rank the plurality of pieces of object data, where the ranking of the plurality of pieces of object data changes according to the index that changes based on the input, the input is to classify reference data which is different from the plurality of pieces of object data, on the basis of a relation between the reference data and the specified case, the classification is executed according to a plurality of pieces of classification information according to the content of the reference data, and at least one of the plurality of pieces of classification information is assigned by the input to the reference data; a fifth step of presenting the reference data to the user; a sixth step of providing a combination of the at least one piece of the classification information, which is assigned to the presented reference data by means of the input by the user, and the reference data; a seventh step of extracting a pattern that characterizes the reference data from the reference data according to the classification information assigned by the input by evaluating a degree of contribution of each of a plurality of components contained in the reference data to the provided combination; an eighth step of setting the extracted pattern as the evaluation standard and determining the index by evaluating the relation between the object data and the specified case on the basis of the extracted pattern; a ninth step of setting the determined index to the object data; a tenth step of ranking the plurality of pieces of object data according to the index; and an eleventh step of reporting the plurality of pieces of ranked object data to the user.

Furthermore, a data analysis program according to the first embodiment of the present invention has a computer execute each step included in the data analysis method according to the first embodiment.

Furthermore, a storage medium according to the first embodiment of the present invention records the data analysis program according to the first embodiment.

Furthermore, a data analysis system according to another embodiment of the present invention is a data analysis system which is equipped with a memory and one or more controllers capable of executing one or more programs stored in the memory and evaluates each of a plurality of pieces of data included in data sets stored in memory, wherein the controller: acquires a data set, which includes a plurality of combinations of reference data and classification information for classifying the reference data, as a reference data set; learns a pattern contained in the reference data by evaluating the degree of contribution of a plurality of components constituting at least part of the reference data to the plurality of combinations included in the above-obtained reference data set; evaluates each of a plurality of pieces of object data by ranking the plurality of pieces of object data based on the learned pattern; and presents the plurality of pieces of object data via a specified display interface to a user on the basis of the evaluation result of each of the plurality of pieces of object data.

INDUSTRIAL APPLICABILITY

The present invention can be widely applied to arbitrary computers such as personal computers, servers, workstations, and mainframes.

REFERENCE SIGNS LIST 10 client device
12 management computer
14 business server
18 storage system
22 database

What is claimed is:

1. A data analysis system for evaluating a relation between object data and a specified case,
the system comprising a memory and a controller,
wherein the memory at least temporarily stores a plurality of pieces of object data;
wherein the controller:
generates an index that enables a ranking of the plurality of pieces of object data, the index being capable of being modified based on an input by a user;
permits the user to enter the input in order for the controller to rank the plurality of pieces of object data,
wherein the ranking of the plurality of pieces of object data changes according to the index that changes based on the input, the input classifying a reference data different from the plurality of pieces of object data on the basis of a relation between the reference data and the specified case;
wherein the classification is executed in response to the input by the user assigning at least one of the plurality of pieces of classification information to the reference data according to the content of the reference data;
wherein a combination of the at least one of the plurality of pieces of classification information and the reference data is set by the entry of the input; and
wherein the controller further:
extracts, from the reference data, a pattern that characterizes the reference data according to the classification information assigned by the input by evaluating a degree of contribution of each of a plurality of components contained in the reference data to the combination;
sets the index for each of the plurality of the object data on the basis of the pattern;
ranks the plurality of pieces of object data according to the index;
reports the plurality of pieces of ranked object data to the user;
on the basis of an additional input from the user, modifies the classification assigned to the reference data, and extracts, from the reference data, a new pattern that characterizes the reference data;
sets a modified index for each of the plurality of the object data on the basis of the new pattern;
further ranks the plurality of pieces of object data according to the modified index; and
further reports the plurality of pieces of further ranked object data to the user.

2. The data analysis system according to claim 1, wherein the controller:
judges whether the plurality of pieces of object data satisfy a predetermined judgment standard;
selects a predetermined quantity of the object data from the plurality of pieces of object data determined to satisfy the predetermined judgment standard;
re-evaluates each of the predetermined quantity of the object data based on the pattern; and
changes the predetermined judgment standard to fit a result of the re-evaluation based on a result of the re-evaluation.

3. The data analysis system according to claim 1, wherein the controller:
acquires a combination of new reference data and the classification information assigned to the new reference data;
updates the pattern by evaluating the degree of contribution of at least some component of the new reference data to the combination of the new reference data and the classification information; and
determines the index by evaluating the relation between the object data and the specified case based on the updated pattern.

4. The data analysis system according to claim 1, wherein the controller:
calculates a recall ratio based on a result of the evaluation of the plurality of pieces of object data; and
repeatedly extracts the pattern from the reference data so that the recall ratio will increase.

5. The data analysis system according to claim 1, wherein every time the combination is set, the controller sequentially updates the pattern by evaluating the degree of contribution of at least some component of the reference data corresponding to the classification information to the combination.

6. The data analysis system according to claim 1, wherein the controller:
extracts a concept corresponding to at least some component of the object data by referring to a database in which the component is associated with the concept; and
outputs a summary of the plurality of pieces of object data based on the extracted concept.

7. The data analysis system according to claim 1, wherein the controller clusters the plurality of pieces of object data with respect to each subject commonly included in the plurality of pieces of object data.

8. The data analysis system according to claim 1,
wherein the object data includes at least the user's evaluation information about the specified case; and
wherein the controller extracts, from the object data, a feeling of the user who generated the object data, the feeling caused about the specified case on the basis of the evaluation information.

9. The data analysis system according to claim 1, wherein the controller uses gradation according to a ratio of the object data associated with the classification information to the entire object data and displays distribution of the ratio in a visible manner with respect to the evaluation result of each of the plurality of pieces of object data.

10. The data analysis system according to claim 1,
wherein the plurality of pieces of object data is information transmitted and received between a plurality of computers; and
wherein the controller visualizes closeness between the plurality of computers on the basis of a result of analysis of the transmitted and received information.

11. The data analysis system according to claim 1,
wherein the pattern can change according to elapse of time; and
wherein the controller:
- acquires the reference data at every specified time interval;
- extracts the pattern from each of the plurality of pieces of reference data acquired at the every specified time interval; and
- determines the index by evaluating each of the plurality of pieces of object data at the every specified time interval on the basis of the pattern.

12. The data analysis system according to claim 1,
wherein the controller:
- generates a plurality of partial object data constituting at least part of the object data by dividing the object data;
- evaluates each of the plurality of the partial object data on the basis of the extracted pattern;
- integrates the index obtained by evaluating the plurality of the partial object data; and
- evaluates each of the plurality of pieces of object data by using the integrated index.

13. The data analysis system according to claim 1,
wherein the controller:
- calculates an evaluation value with respect to the component on the basis of strength of relation between the component and the classification information, which classifies the reference data including the component, as a result of evaluation of the degree; and
- evaluates the plurality of pieces of object data by determining the index to indicate whether the object data is highly or lowly related with the specified case, on the basis of the evaluation value calculated for at least some component of the object data.

14. The data analysis system according to claim 1,
wherein the controller:
- evaluates a correlation between the component and another component, which is different from the component, based on frequency at which the component and the other component appear in at least part of the same reference data; and
- further evaluates each of the plurality of pieces of object data on the basis of the correlation.

15. The data analysis system according to claim 1,
wherein the controller presents a next action from the index determined by evaluating the plurality of pieces of object data on the basis of a model capable of predicting progress of a specified action related to the specified case.

16. The data analysis system according to claim 15,
wherein the controller:
- evaluates the plurality of pieces of object data at every phase that is an index indicative of each step of progress of a specified action; and
- identifies a present phase from an index determined for each phase by evaluating the plurality of pieces of object data.

17. The data analysis system according to claim 1,
wherein the object data is document data at least partially including one or more sentences; and
wherein the controller analyzes a structure of the sentence and determines the index of the object data on the basis of a result of the analysis.

18. The data analysis system according to claim 17,
wherein the controller judges an expression form of the sentence on the basis of the analysis result of the structure of the sentence and evaluates the object data on the basis of a result of the judgment.

19. A data analysis method performed by a data analysis system for evaluating a relation between object data and a specified case, the method comprising:
- generating an index that enables ranking of a plurality of pieces of object data, the index being capable of being changed based on an input by a user;
- permitting the user to enter the input in order to rank the plurality of pieces of object data,
  wherein the ranking of the plurality of pieces of object data changes according to the index that changes based on the input, the input classifying the reference data which is different from the plurality of pieces of object data on the basis of a relation between the reference data and the specified case;
  wherein the classification is executed in response to the input by the user assigning at least one of the plurality of pieces of classification information to the reference data according to the content of the reference data;
- setting a combination of the at least one piece of the classification information and the reference data by the entry of the input;
- extracting, from the reference data, a pattern that characterizes the reference data according to the classification information assigned by the input by evaluating a degree of contribution of each of a plurality of components contained in the reference data to the combination;
- setting the index for each of the plurality of the object data on the basis of the pattern;
- ranking the plurality of pieces of object data according to the index;
- reporting the plurality of pieces of ranked object data to the user;
- on the basis of an additional input from the user, modifying the classification assigned to the reference data, and extracting, from the reference data, a new pattern that characterizes the reference data;
- setting a modified index for each of the plurality of the object data on the basis of the new pattern;
- further ranking the plurality of pieces of object data according to the modified index; and
- further reporting the plurality of pieces of further ranked object data to the user.

20. A non-transient computer-readable medium containing program instructions for causing a computer to perform the data analysis method of claim 19.

* * * * *